(12) United States Patent
Jiang

(10) Patent No.: US 12,546,879 B2
(45) Date of Patent: Feb. 10, 2026

(54) COMMUNICATION METHOD, TERMINAL, COMMUNICATION NODE, COMMUNICATION DEVICE, AND STORAGE MEDIUM

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 355 days.

(21) Appl. No.: 18/024,473

(22) PCT Filed: Sep. 4, 2020

(86) PCT No.: PCT/CN2020/113609
§ 371 (c)(1),
(2) Date: Mar. 2, 2023

(87) PCT Pub. No.: WO2022/047752
PCT Pub. Date: Mar. 10, 2022

(65) Prior Publication Data
US 2024/0027603 A1 Jan. 25, 2024

(51) Int. Cl.
*G01S 13/76* (2006.01)
(52) U.S. Cl.
CPC .................. *G01S 13/765* (2013.01)
(58) Field of Classification Search
CPC ........ G01S 13/765; G01S 13/87; G01S 7/006; G01S 13/08; G01S 13/46; G01S 2013/466; H04L 63/107; H04W 8/24; H04W 4/023; H04W 12/08; H04W 64/00; H04W 76/14; H04W 72/541
See application file for complete search history.

(56) References Cited

U.S. PATENT DOCUMENTS

| | | | |
|---|---|---|---|
| 9,706,359 B2* | 7/2017 | Do | H04W 4/023 |
| 2017/0086024 A1* | 3/2017 | Do | H04W 74/002 |

(Continued)

FOREIGN PATENT DOCUMENTS

| | | |
|---|---|---|
| CN | 107852574 A | 3/2018 |
| CN | 108027432 A | 5/2018 |

(Continued)

OTHER PUBLICATIONS

European Patent Application No. 20951996.6, Search and Opinion dated Apr. 23, 2024, 11 pages.

(Continued)

*Primary Examiner* — Robert W Hodge
*Assistant Examiner* — Bongani Jabulani Mashele
(74) *Attorney, Agent, or Firm* — Cozen O'Connor

(57) ABSTRACT

Embodiments of the present disclosure provide a communication method, which is applied in a terminal, and includes: receiving a ranging authorization policy, the ranging authorization policy at least indicating: whether the terminal has measurement ranging permission. A ranging authorization policy may be at least one of a permission indication, indicating at least the ranging permission, a business indication, indicating at least a ranging-related business, or an indication for a first effective time, indicating an effective time of the ranging authorization policy.

16 Claims, 8 Drawing Sheets

(56) References Cited

U.S. PATENT DOCUMENTS

| | | | | |
|---|---|---|---|---|
| 2019/0135229 A1* | 5/2019 | Ledvina | ............... | H04W 12/64 |
| 2019/0274130 A1* | 9/2019 | Cheng | ................. | H04W 72/12 |
| 2020/0008110 A1* | 1/2020 | Yousif | .................. | H04W 24/02 |
| 2020/0106877 A1* | 4/2020 | Ledvina | ............ | H04M 1/72436 |

FOREIGN PATENT DOCUMENTS

| | | |
|---|---|---|
| CN | 112219437 A | 1/2021 |
| EP | 3332563 A1 | 6/2018 |
| WO | WO 2020069311 A1 | 4/2020 |

OTHER PUBLICATIONS

Indian Patent Application No. 202347025305, Office Action dated Sep. 6, 2023, 6 pages.
PCT/CN2020/113609, English translation of Search Report dated Feb. 1, 2021, 2 pages.
Indian Patent Application No. 202347025305 Office Action dated Dec. 2, 2025, 2 pages.
3RD Generation Partnership Project, "Technical Specification Group Services and System Aspects; Policy and charging control architecture (Release 15)", 3GPP TS 23.203 V15.4.0, Sep. 2018, 260 pages.
3RD Generation Partnership Project, "Technical Specification Group Services and System Aspects; Proximity-based services (ProSe); Stage 2 (Release 15)", 3GPP TS 23.303 V15.1.0, Jun. 2018, 130 pages.

* cited by examiner

COMMUNICATION METHOD, TERMINAL, COMMUNICATION NODE, COMMUNICATION DEVICE, AND STORAGE MEDIUM

CROSS-REFERENCE TO RELATED APPLICATION

This application is a U.S. national phase of International Application No. PCT/CN2020/113609, filed with the State Intellectual Property Office of P. R. China on Sep. 4, 2020, the content of which is incorporated herein by reference in its entireties.

TECHNICAL FIELD

The disclosure relates to a field of wireless communication technology but is not limited to the field of wireless communication technology, in particular to a communication method, a terminal, a network side communication node, a communication device, and a storage medium.

BACKGROUND

With the development of terminal positioning technology, the ability to determine relative positioning between terminals enhances user experience in many applications. For example, in a large parking lot, the positioning between a cell phone and a vehicle can facilitate a vehicle owner in quickly locating the vehicle through the cell phone. In order to support direct communication between terminals, a wireless communication method using a sidelink between terminals is introduced, in which the interface between the terminals is referred to as PC-5.

In the related art, when a direct link (sidelink) for ranging wireless communication is executed, the terminal(s) may frequently initiate ranging, which occupies the limited wireless resources used for ranging and thus, is not conducive for effective utilization of the wireless resources. On the other hand, if each terminal can initiate ranging at any time, serious channel interference may occur.

SUMMARY

According to the first aspect of the disclosure, a communication method is provided. The method includes:
receiving, by a terminal, a ranging authorization policy; in which the ranging authorization policy at least indicates whether the terminal has a ranging permission.

According to the second aspect of the disclosure, a communication method is provided. The method includes:
sending, by a network side communication node, a ranging authorization policy;
in which the ranging authorization policy at least indicates whether a terminal has a ranging permission.

According to the third aspect of the disclosure, a communication device is provided. The communication device includes:
a processor;
a memory configured to store instructions executable by the processor; and
in which the processor is configured to execute the instructions to perform the method of any embodiment of the disclosure.

DETAILED DESCRIPTION

Reference will now be made in detail to exemplary embodiments, examples of which are illustrated in the accompanying drawings. The following description refers to the accompanying drawings in which the same or similar numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms "first", "second", and "third" may be used in this disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

For the purpose of simplicity and ease of understanding, the terms "greater than" or "less than" are used in the disclosure to represent the size relation. However, for those skilled in the art, it can be understood that the term "greater than" covers the meaning of "greater than or equal to", and "less than" covers the meaning of "less than or equal to".

Figure 1:
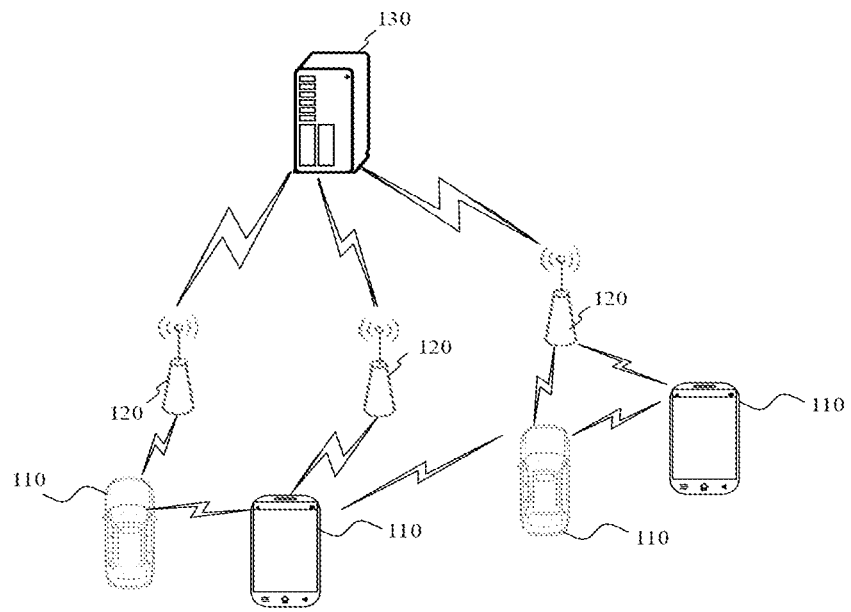
FIG. 1 is a schematic diagram of a wireless communication system.

FIG. 1 is a schematic diagram of a wireless communication system according to an embodiment of the disclosure. As shown in FIG. 1, the wireless communication system is a communication system based on the cellular mobile communication technology, and the wireless communication system may include: a plurality of User Equipments (UEs) 110 and a plurality of base stations 120.

The UE 110 may be a device that provides voice and/or data connectivity to a user. The UE 110 may communicate with one or more core networks via a Radio Access Network (RAN). The UE 110 may be an Internet of Things (IoT) UE, such as a sensor device, a mobile phone (or "cellular" phone) and a computer with the IoT UE. The UE 110 may be a fixed, portable, pocket, hand-held, built-in computer or a vehicle-mounted device, such as, a Station (STA), a subscriber unit, a subscriber station, a mobile station, a mobile, a remote station, an access point, a remote terminal, an access terminal, a user terminal, a user agent, a user device, or a UE. Alternatively, the UE 110 may also be an Unmanned Aerial Vehicle (UAV) device. Alternatively, the UE 110 may also be a vehicle-mounted device, such as, an Engine Control Unit (ECU) with a wireless communication function, and a wireless communication device connected to the ECU. Alternatively, the UE 110 may also be a roadside device, such as, a street light, a signal light, or other roadside devices with a wireless communication function.

The base station 120 may be a network side device in the wireless communication system. The wireless communication system may be the 4th generation (4G) mobile communication system, also known as a Long Term Evolution (LTE) system. Alternatively, the wireless communication system may also be the 5th generation (5G) mobile communication system, also known as a NR system or 5G NR system. Alternatively, the wireless communication system may also be a next-generation system of the 5G system. The access network in the 5G system may be called New Generation-Radio Access Network (NG-RAN).

The base station 120 may be an evolved base station (eNB) in the 4G system. Alternatively, the base station 120 may also be a base station (gNB) that adopts a centralized distributed architecture in the 5G system. When the base station 120 adopts a centralized distributed architecture, it generally includes a Central Unit (CU) and at least two Distributed Units (DUs). The CU is provided with a protocol stack including a Packet Data Convergence Protocol (PDCP) layer, a Radio Link Control (RLC) layer, and a Media Access Control (MAC) layer. A physical (PHY) layer protocol stack is set in the DU, and the specific implementation manner of the base station 120 is not limited in this embodiment of the disclosure.

A wireless connection can be established between the base station 120 and the UE 110 through a radio interface. In different embodiments, the radio interface is a radio interface based on the 4G standard. Alternatively, the radio interface is a radio interface based on the 5G standard, such as, a NR. Alternatively, the radio interface may also be a radio interface based on a next generation of the 5G standard.

In some embodiments, an End to End (E2E) connection may also be established between the UEs 110, for example, scenes of Vehicle to Vehicle (V2V) communication, Vehicle to Infrastructure (V2I) communication and Vehicle to Pedestrian (V2P) communication in a Vehicle to Everything (V2X) communication.

The above UE can be considered as a terminal device in the following embodiments.

In some embodiments, the above wireless communication system may further include a network management device 130.

A plurality of the base stations 120 are connected to the network management device 130 respectively. The network management device 130 may be a core network device in the wireless communication system. For example, the network management device 130 may be a Mobility Management Entity (MME) in an Evolved Packet Core (EPC). Alternatively, the network management device may also be other core network device, such as a Serving GateWay (SGW), a Public Data Network GateWay (PGW), a Policy and Charging Rules Function (PCRF) or a Home Subscriber Server (HSS). The implementation form of the network management device 130 is not limited in this embodiment of the disclosure.

To facilitate understanding of any embodiment of the disclosure, firstly, the method of relative positioning between terminals is described.

In an embodiment, a business based on ranging may be a business that provides a service based on determining a relative position between the terminals. Determining the relative position between the terminals may be achieved by relative positioning. The relative positioning may refer to determining a relative distance and/or a relative angle between the terminals. The relative distance may be an absolute distance between the terminals. The relative angle may be an AOA or an AOD.

Figure 2:
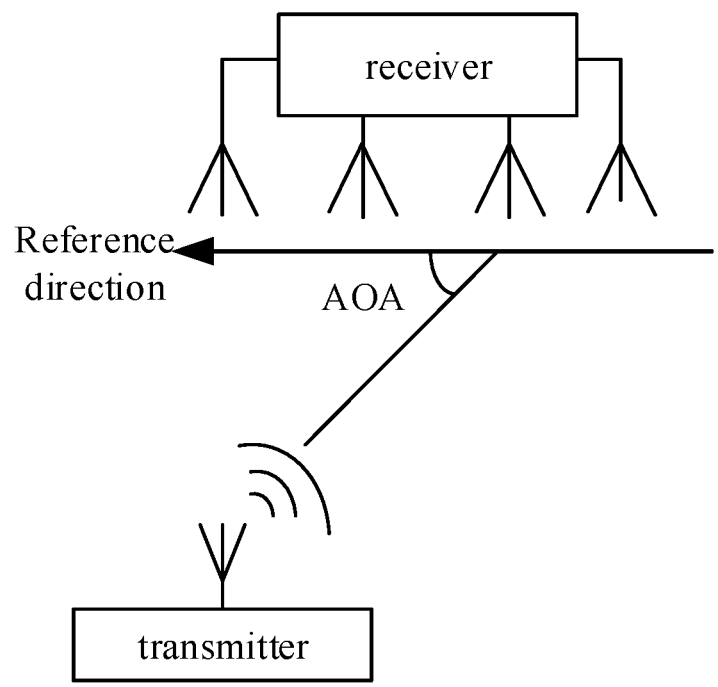
FIG. 2 is a schematic diagram of an Angle of Arrival (AOA) according to an example embodiment.
Figure 3:
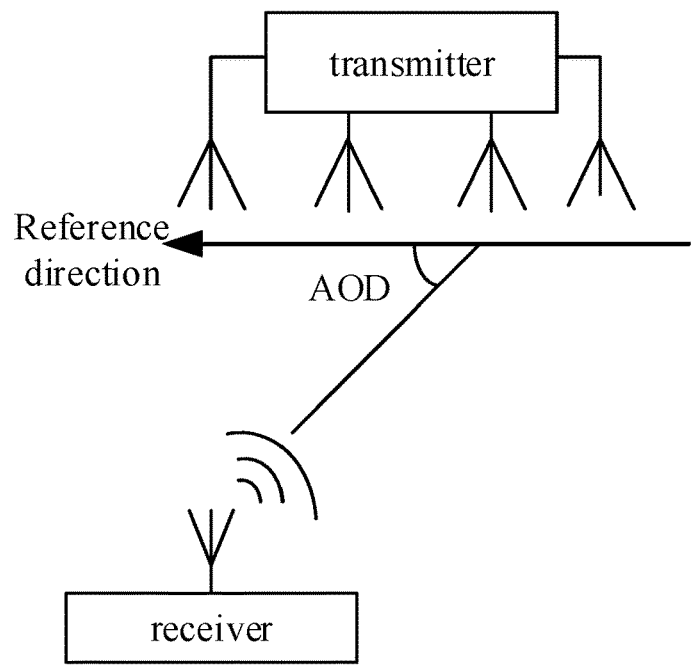
FIG. 3 is a schematic diagram of an Angle of Departure (AOD) according to an example embodiment.

In an embodiment, as shown in FIG. 2, the AOA may be an angle between a signal receiving direction of a receiver of the terminal and a reference direction. In an embodiment, as shown in FIG. 3, the AOD is an angle between a signal transmitting direction of a transmitter of the terminal and the reference direction. In an embodiment, the reference direction is a direction determined based on a position and/or shape of an antenna.

Figure 4:
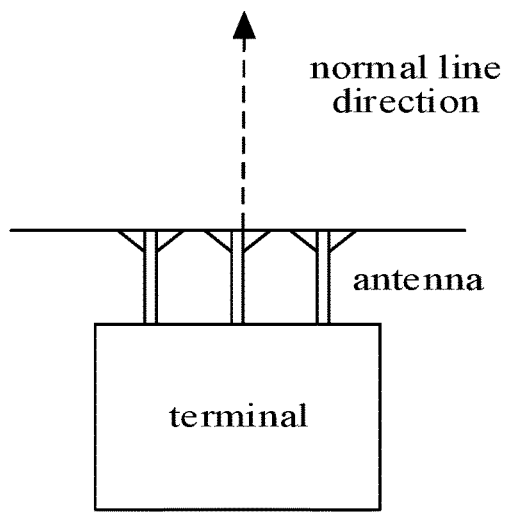
FIG. 4 is a schematic diagram of a reference direction according to an example embodiment.

In an embodiment, as shown in FIG. 4, the direction pointed by a terminal is a normal line direction of an antenna array of the terminal, and the reference direction can be a direction perpendicular to the normal line direction.

Figure 5:
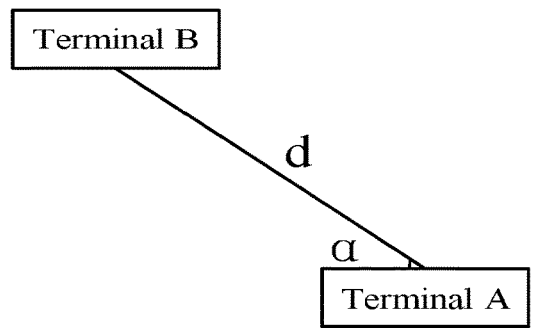
FIG. 5 is a schematic diagram of relative positioning according to an example embodiment.

In an embodiment, the relative position between two terminals can be determined based on the relative distance and/or the relative angle. In an embodiment, the relative position between two terminals can be jointly determined based on the relative distance and the relative angle. As shown in FIG. 5, in an embodiment, the terminal A can determine a relative position of the terminal B relative to the terminal A by obtaining the relative distance d between the terminal A and the terminal B and the AOA a of a signal sent by the terminal B arriving at the terminal A. In an embodiment, the terminal A can determine a relative position of the terminal B relative to the terminal A by obtaining the relative distance between the terminal A and the terminal B and the AOD a of a signal sent by the terminal A leaving the terminal A.

In an embodiment, a start terminal sends an initial ranging signal when the relative positioning between the terminals is performed. After receiving the initial ranging signal, a feedback terminal sends a feedback ranging signal to the start terminal for feedback. After receiving the feedback ranging signal, the start terminal calculates the relative distance between the two terminals based on a time difference between sending the initial ranging signal and receiving the feedback ranging signal. Meanwhile, the terminal can calculate the relative angle by measuring a relation between a direction of the ranging signal and the reference direction of the terminal. The relative positioning between the terminals is performed based on the relative distance and the relative angle.

In an embodiment, a ranging mode may include: a unilateral ranging mode and a bilateral ranging mode. The unilateral ranging mode is a ranging mode in which only one terminal is involved in Time of Flight (TOF) calculation. The bilateral ranging mode is a mode in which both terminals are involved in the TOF calculation.

In an embodiment, the distance between the terminals=TOF×light speed.

Figure 6:
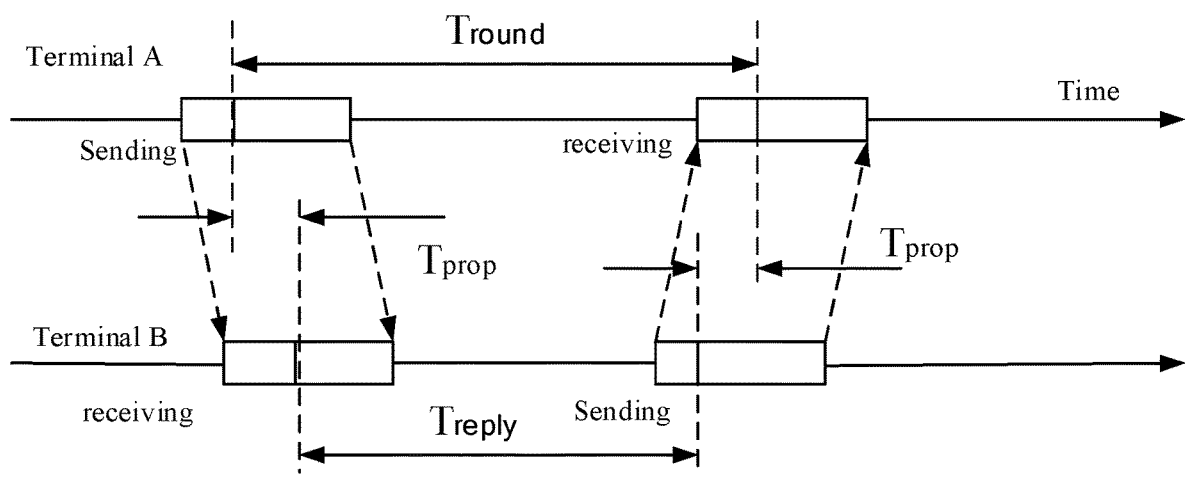
FIG. 6 is a schematic diagram of unilateral ranging according to an example embodiment.

In an embodiment, as shown in FIG. 6, the TOF calculation process of the unilateral ranging mode include the following steps.

At step a1, the terminal A measures a length of time Tround.

At step a2, the terminal B calculates a length of time Treply.

At step a3, the terminal B sends Treply to the terminal A.

At step a4, the TOF is calculated according to $$TOF = T_{prop} = (T_{round} - T_{reply})/2.$$

Figure 7:
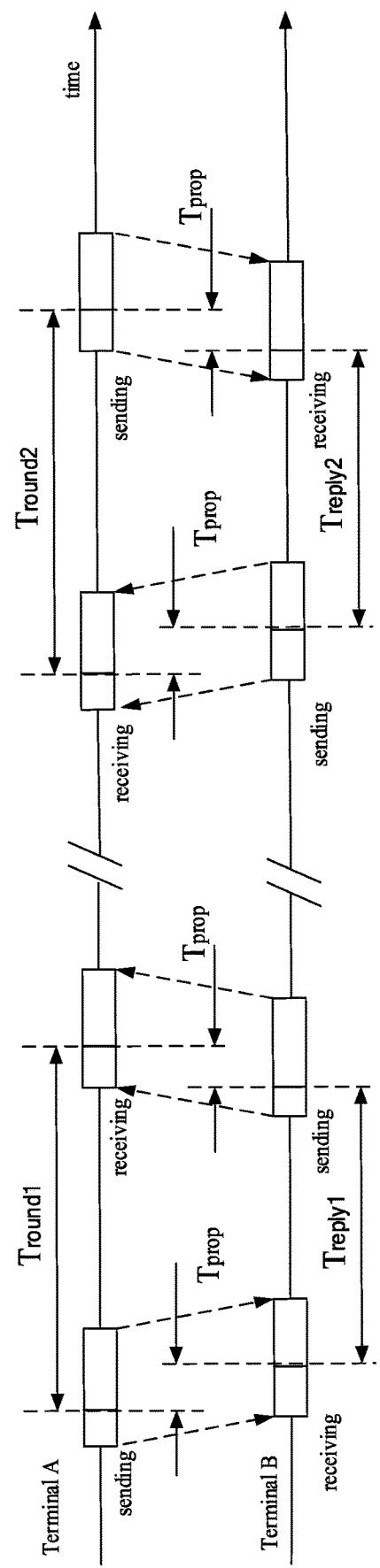
FIG. 7 is a schematic diagram of bilateral ranging according to an example embodiment.

In an embodiment, as shown in FIG. 7, the TOF calculation process of the bilateral ranging mode include the following steps.

At step b1, the terminal A initiates a first round of ranging, and calculates a round-trip duration of the ranging signal in the first round: $T_{round1}$ and $T_{reply1}$.

At step b2, the terminal B initiates a second round of ranging, and calculates the round-trip duration of the ranging signal in the second round: $T_{round2}$ and $T_{reply2}$.

At step b3, the TOF is calculated according to $$TOF = T_{prop} = (T_{round1} \times T_{round2} - T_{reply1} \times T_{reply2})/(T_{round1} + T_{round2} + T_{reply1} + T_{reply2})$$

Figure 8:
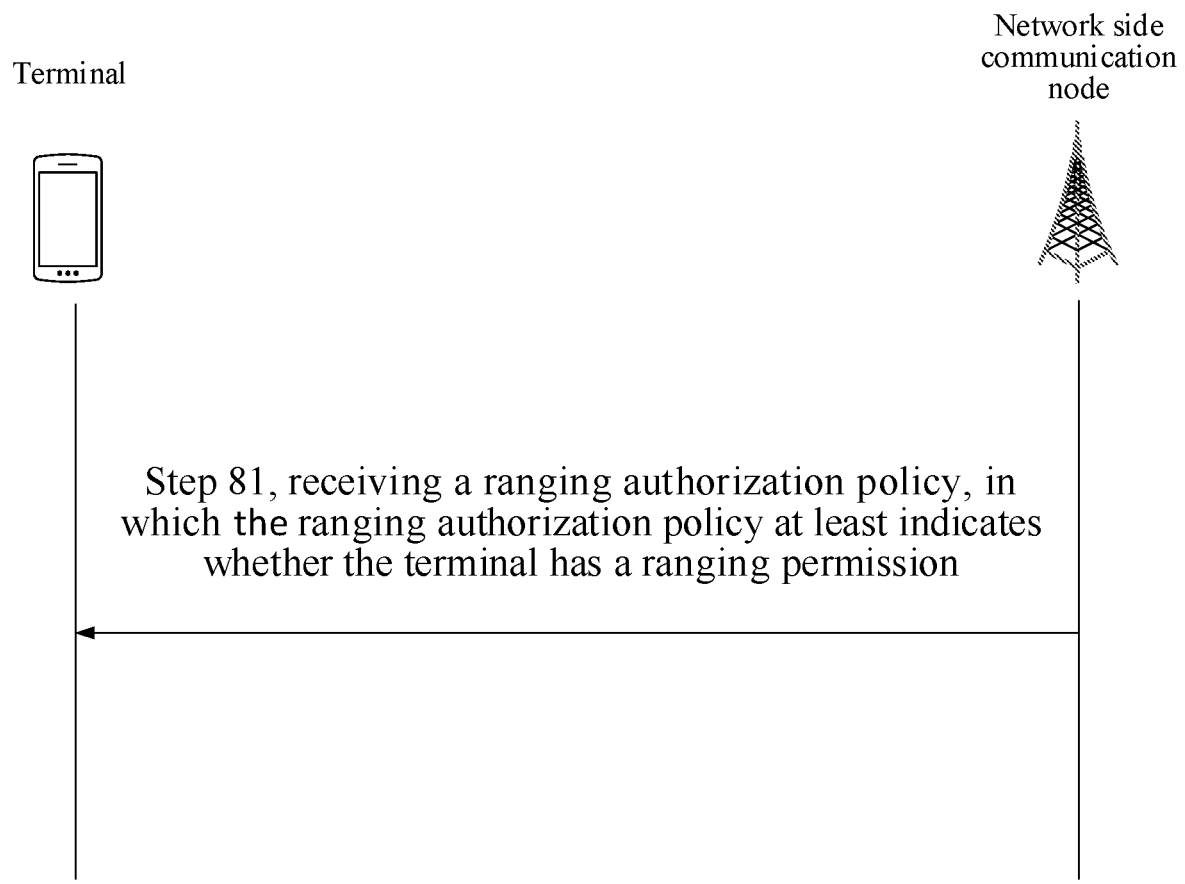
FIG. 8 is a flowchart of a communication method according to an example embodiment.

As shown in FIG. 8, a communication method, applied to a terminal, is provided in this embodiment. The method includes the following steps.

At step 81, a ranging authorization policy is received.

The ranging authorization policy at least indicates whether the terminal has a ranging permission.

The terminal may be, but is not limited to, a cell phone, a wearable device, a vehicle-mounted terminal, a Road Side Unit (RSU), a smart home terminal, an industrial sensing device, and/or a medical device.

In an embodiment, the ranging authorization policy may be a ranging authorization policy sent by a base station. The base station is an interface device for the terminal to access the network. The base station may be of various types, e.g., a 3G base station, a 4G base station, a 5G base station, or other evolved base stations.

In an embodiment, the ranging authorization policy may be a ranging authorization policy sent by an evolved network side communication node. The communication node may be an Access Control and Mobility Management Function (AMF) entity and a Policy Control Function (PCF) entity in a 5G network.

In an embodiment, the ranging authorization policy may include at least an authorization indication, which at least indicates whether the ranging permission is available. In the embodiment, upon receiving the ranging authorization policy, the terminal initiates ranging when the ranging authorization policy indicates that the terminal has the ranging permission. When the ranging authorization policy indicates that the terminal does not have the ranging permission, the ranging cannot be initiated. Compared with the mode that the ranging can be initiated without considering the ranging authorization policy, on the one hand, the ranging is initiated according to the indication of the ranging authorization policy, which means that the terminal needs to be authorized to initiate the ranging, so that the occupation of wireless resources for the ranging initiated by a large number of unauthorized terminals can be reduced. On the other hand, the terminal initiates the ranging according to the indication of the ranging authorization policy, thus reducing the interference to the wireless communication channels of other terminals that perform the ranging caused by the terminal initiating the ranging at any time without authorization.

In an embodiment, the ranging authorization policy includes at least one of:
  a permission indication, indicating at least the ranging permission;
  a business indication, indicating at least a ranging related business; or
  an indication for a first effective time, indicating an effective time of the ranging authorization policy.

In an embodiment, the permission indication may indicates the ranging permission possessed by the terminal. The ranging permission may indicate whether the terminal can initiate ranging actively, or whether the terminal can initiate ranging passively, or other ranging related permissions. The permission indication can specify for authorization indication which ranging permission the terminal has when the terminal has the ranging permission.

In another embodiment, the ranging authorization policy may not include the aforementioned authorization indication, and may indirectly and implicitly indicate that the terminal has the ranging permission directly through the permission indication.

In an embodiment, the business indication may indicate different business types, which may be business types with different business characteristics, such as, a business type with a business characteristic of requiring security protection and a business type with a business characteristic of requiring privacy protection. In an embodiment, when a business requires security protection and/or privacy protection, a secure connection is used for ranging. For example, a secure unicast connection established based on PC5 interfaces is used for ranging. When the business does not require security protection and privacy protection, a connection other than the secure connection can be used for ranging.

In an embodiment, the effective time includes an effective time point of the ranging authorization policy and an ineffective time point of the ranging authorization policy. For example, the effective time point of the ranging authorization policy is 12:30, and the ineffective time point of the ranging authorization policy is 14:30.

In an embodiment, the effective time includes the effective time point of the ranging authorization policy and an effective duration. For example, the effective time point of the ranging authorization policy is 12:30, and the effective duration is 2 hours.

In an embodiment, the permission indication includes at least one of:
  an indication for permission of initiating ranging, indicating whether permission to actively initiate ranging between terminals is available;

an indication for permission of monitoring ranging, indicating whether permission to monitor a ranging request sent by another terminal other than the terminal is available;

an indication for distance measurement permission, indicating whether permission to perform distance measurement is available;

an indication for angle measurement permission, indicating whether permission to perform angle measurement is available;

an indication for ranging accuracy permission, indicating whether permission to perform ranging with a ranging accuracy greater than an accuracy threshold is available;

an indication for ranging range permission, indicating permission to perform ranging within a preset ranging range;

an indication for carrier frequency permission, indicating permission to use a carrier frequency for ranging;

an indication for ranging mode permission, indicating permission to use a unilateral ranging mode or a bilateral ranging mode for ranging; or an indication for wireless resource permission, indicating permission to use a wireless resource for ranging when there is no NR signal coverage.

In an embodiment, when the indication for permission of initiating ranging is a first indication, the terminal is allowed to initiate the ranging between the terminals actively, i.e., the terminal has the permission to initiate the ranging between the terminals actively. When the indication for permission of initiating ranging is a second indication, the terminal is forbidden to initiate the ranging between the terminals actively, i.e., the terminal does not have the permission to initiate the ranging between the terminals actively. The operation of actively initiating the ranging between the terminals may be an operation of sending by a terminal a ranging request message to another terminal to request the another terminal to perform ranging.

In an embodiment, the network side communication node may store an authorization list of IDs of terminals that can initiate ranging. The terminals corresponding to the IDs have the permission to initiate the ranging between the terminals actively. If the ID of the terminal that requests to initiate the ranging is in the authorization list, the indication for permission of initiating ranging is set to the first indication. If the ID of the terminal that requests to initiate the ranging is not in the authorization list, the indication for permission of initiating ranging is set to the second indication. In this way, it is possible to prohibit the unauthorized terminal from initiating the ranging between the terminals, to reduce the occupation of wireless resources for ranging. Meanwhile, ranging can be initiated only after the terminal is authorized, which can reduce the interference to the wireless communication channels of other terminals that perform the ranging caused by the terminal initiating the ranging at any time without authorization.

In an embodiment, the terminal sends ranging capability information to the base station, so that the base station can receive the ranging capability information sent by the terminal. When the ranging capability information indicates that the terminal supports ranging, the indication for permission of initiating ranging can be set to the first indication. When the ranging capability information indicates that the terminal does not support ranging, the indication for permission of initiating ranging is set to the second indication.

In an embodiment, when the indication for permission of monitoring ranging is a first indication, the terminal is allowed to monitor the ranging request sent by another terminal other than the terminal, i.e., the terminal has the permission to monitor the ranging request sent by another terminal other than the terminal. When the indication for permission of monitoring ranging is a second indication, the terminal is forbidden to monitor the ranging request sent by another terminal other than the terminal, i.e., the terminal does not have the permission to monitor the ranging request sent by another terminal other than the terminal. In an embodiment, in response to the base station having the permission to monitor the ranging request sent by another terminal other than the terminal, the base station can perform the ranging when the ranging request is monitored.

In an embodiment, the network side communication node may store an authorization list of IDs of terminals that can monitor the ranging request sent by another terminal other than the terminal. Each of the terminals corresponding to the IDs has the permission to monitor the ranging request sent by another terminal other than the terminal. When the ID of the terminal that requests to monitor another terminal other than the terminal is in the authorization list, the indication for permission of monitoring ranging is set to the first indication. When the ID of the terminal that requests to monitor the ranging request sent by another terminal other than the terminal is not in the authorization list, the indication for permission of monitoring ranging is set to the second indication. In this way, it is possible to prohibit an unauthorized terminal from monitoring the ranging request sent by another terminal other than the terminal, to reduce the occupation of wireless resources for ranging. Meanwhile, the security of information transmission can be ensured since only the authorized terminal can monitor the ranging request sent by another terminal other than the terminal.

In an embodiment, when the terminal supports distance measurement, the distance measurement permission indication indicates that the terminal has the permission to perform distance measurement. When the terminal does not support distance measurement, the indication for distance measurement permission indicates that the terminal does not have the permission to perform distance measurement.

In an embodiment, when the terminal supports angle measurement, the angle measurement permission indication indicates that the terminal has the permission to perform angle measurement. When the terminal does not support angle measurement, the indication for angle measurement permission indicates that the terminal does not have the permission to perform angle measurement.

In an embodiment, when the terminal supports both distance measurement and angle measurement, the indication for distance measurement permission indicates that the terminal has the permission to perform distance measurement, and the indication for angle measurement permission indicates that the terminal has the permission to perform angle measurement.

In an embodiment, when the terminal supports distance measurement but does not support angle measurement, the indication for distance measurement permission indicates that the terminal has the permission to perform distance measurement, and the indication for angle measurement permission indicates that the terminal does not have the permission to perform angle measurement.

In an embodiment, when the terminal does not support distance measurement but supports angle measurement, the indication for distance measurement permission indicates that the terminal does not have the permission to perform distance measurement, and the indication for angle measurement permission indicates that the terminal has the permission to perform angle measurement.

In an embodiment, when the terminal supports neither distance measurement nor angle measurement, the indication for distance measurement permission indicates that the terminal does not have the permission to perform distance measurement, and the indication for angle measurement permission indicates that the terminal does not have the permission to perform angle measurement.

In an embodiment, when the indication for angle measurement mode permission is a first indication, it indicates that the terminal has permission to perform angle measurement by measuring the AOA. When the indication for angle measurement mode permission is a second indication, it indicates that the terminal has permission to perform angle measurement by measuring the AOD. In an embodiment, as shown in FIG. 4, the reference direction for measuring the AOA and measuring the AOD can be perpendicular to the normal line direction of the terminal.

In an embodiment, when a required accuracy of the ranging business of the terminal is greater than a preset accuracy threshold, the indication for ranging accuracy permission indicates that the terminal has the permission to perform ranging with a ranging accuracy greater than the accuracy threshold. When the required accuracy of the ranging business of the terminal is less than the preset accuracy threshold, the indication for ranging accuracy permission indicates that the terminal does not have the permission to perform ranging with a ranging accuracy greater than the accuracy threshold.

In an embodiment, the terminal may obtain ranging data with different accuracies by using different accuracy levels for ranging. The higher the accuracy level used by the terminal, the higher the accuracy of the data obtained. For example, an error between the ranging data obtained using a first accuracy level for ranging and actual data is less than a, and an error between the ranging data obtained using a second accuracy level for ranging and the actual data is less than b, here a<b, and the first accuracy level is higher than the second accuracy level.

In an embodiment, the accuracy of the ranging data obtained within different accuracy ranges may be different. The higher the accuracy corresponding to the accuracy range used by the terminal, the higher the accuracy of the obtained ranging data. For example, a first accuracy range is [c, d] and a second accuracy range is [e, f], in which c<e. The accuracy of the ranging data obtained within the first accuracy range is greater than the accuracy of the ranging data obtained within the second accuracy range.

In an embodiment, the carrier frequency may be a communication frequency for ranging between the terminals using a sidelink. Since the carrier frequency is uniformly indicated by the indication for carrier frequency permission, the resources can be scheduled by the a unified resource scheduling algorithm, which can timely reduce the interference among transmission channels caused by resource collision when using the sidelink wireless communication for relative positioning between different terminals, thereby improving the channel communication quality and ensuring the accuracy of relative positioning.

In an embodiment, the carrier frequency is selected from a pre-configured positioning resource pool, which reduces the resource collision and ensures the accuracy of relative positioning.

In an embodiment, when a time delay required by the ranging business of the terminal is less than a time delay threshold, the indication for ranging mode permission indicates that the ranging is performed using the unilateral ranging mode. When the time delay required by the ranging business of the terminal is greater than the time delay threshold, the indication for ranging mode permission indicates that the ranging is performed using the bilateral ranging mode.

In an embodiment, when an error required by the ranging business of the terminal is less than an error threshold, the indication for ranging mode permission indicates that the ranging is performed using the bilateral ranging mode. When the error required by the ranging business of the terminal is greater than the error threshold, the indication for ranging mode permission indicates that the ranging is performed using the unilateral ranging mode.

In an embodiment, the indication for wireless resource permission may indicate that the terminal uses unauthorized spectrum resources for ranging when there is no NR signal coverage, which avoids the situation that the terminal cannot perform the ranging when it is not located in an NR signal coverage area.

In an embodiment, the indication for wireless resource permission may indicate unauthorized spectrum resources used when there is no NR signal coverage.

In an embodiment, the permission indication further includes an indication for angle measurement mode permission, and the indication for angle measurement mode permission indicates at least one of:
  whether permission to perform angle measurement by measuring an AOA is available, in which the AOA is an angle between a signal receiving direction of a receiving antenna and a reference direction;
  or,
  whether permission to perform angle measurement by measuring an AOD is available, in which the AOD is an angle between a signal transmitting direction of a transmitting antenna and the reference direction.

In an embodiment, when the indication for angle measurement mode permission is a first indication, it indicates that the terminal has the permission to perform angle measurement by measuring the AOA. When the indication for angle measurement mode permission is a second indication, it indicates that the terminal has the permission to perform angle measurement by measuring the AOD. In an embodiment, as shown in FIG. 4, the reference direction for measuring the AOA and measuring the AOD can be the direction perpendicular to the normal line direction of the terminal.

In an embodiment, the ranging accuracy includes at least one of:
  an angle measurement accuracy; or
  a distance measurement accuracy.

In an embodiment, the permission indication further includes at least one of:
  an indication for accuracy level permission, indicating permission to perform ranging based on an angle measurement accuracy level; or
  an indication for accuracy range permission, indicating permission to perform ranging within an accuracy range.

In an embodiment, when the accuracy required by the ranging business of the terminal is greater than the preset accuracy threshold, the indication for ranging accuracy permission indicates that the terminal has the permission to perform ranging with the ranging accuracy greater than the accuracy threshold. When the accuracy required by the ranging business of the terminal is less than the preset accuracy threshold, the indication for ranging accuracy permission indicates that the terminal does not to have the permission to perform ranging with the ranging accuracy greater than the accuracy threshold.

In an embodiment, the terminal may obtain ranging data with different accuracies by using different accuracy levels for ranging. The higher the accuracy level used by the terminal, the higher the accuracy of the data obtained. For example, the error between the ranging data obtained using the first accuracy level for ranging and the actual data is less than a, and the error between ranging data obtained using the second accuracy level for ranging and the actual data is less than b. Here, a<b, and the first accuracy level is higher than the second accuracy level.

In an embodiment, the accuracy of the ranging data obtained within different accuracy ranges may be different. The higher the accuracy corresponding to the accuracy range used by the terminal, the higher the accuracy of the obtained ranging data. For example, the first accuracy range is [c, d] and the second accuracy range is [e, f], in which c<e. The accuracy of the ranging data obtained within the first accuracy range is greater than the accuracy of the ranging data obtained within the second accuracy range.

In an embodiment, the unilateral ranging mode is a mode of performing ranging based on a ranging signal sent by one of two terminals involved in the ranging, and the bilateral ranging mode is a mode of performing ranging based on ranging signals sent by both terminals involved in the ranging.

In an embodiment, when the time delay required by the ranging business of the terminal is less than the time delay threshold, the indication for ranging mode permission indicates that the ranging is performed using the unilateral ranging mode. When the time delay required by the ranging business of the terminal can be greater than the time delay threshold, the indication for ranging mode permission indicates that the ranging is performed using the bilateral ranging mode.

In an embodiment, when the error required by the ranging business of the terminal is less than the error threshold, the indication for ranging mode permission indicates that the ranging is performed using the bilateral ranging mode. When the error required by the ranging business of the terminal can be greater than the error threshold, the indication for ranging mode permission indicates that the ranging is performed using the unilateral ranging mode.

In an embodiment, the business indication includes at least one of:
  an indication for a privacy protection business, indicating a business for which privacy protection is performed;
  an indication for a second effective time, indicating a time to conduct privacy protection on the business for which privacy protection is performed;
  an indication for a security protection business, indicating a business for which security protection is performed;
  an indication for a third effective time, indicating a time to conduct security protection on the business for which security protection is performed;
  an indication for a first mapping relation, indicating a mapping relation between business types and carrier frequencies used for ranging; or
  an indication for a second mapping relation, indicating a mapping relation between business types and application layer IDs.

In an embodiment, the privacy protection business may be a business whose identity information needs to be protected during the course of business. For example, the identity information can be type information of the business and ID information of the terminal of the business.

In an embodiment, the security protection business may be a business whose data transmitted during the course of business needs to be protected.

In an embodiment, the first effective time and the second effective time include the effective time point of the ranging authorization policy and the ineffective time point of the ranging authorization policy. For example, the effective time point of the ranging authorization policy is 12:30, and the ineffective time point of the ranging authorization policy is 14:30.

In an embodiment, the first effective time and the second effective time include the effective time point of the ranging authorization policy and the effective duration. For example, the effective time point of the ranging authorization policy is 12:30, and the effective duration is 2 hours.

In an embodiment, the terminal can select the carrier frequency with less interference for ranging according to the mapping relation between the business types and the carrier frequencies used for ranging, to improve the accuracy of ranging.

In an embodiment, the terminal can determine the application layer ID for each type of business based on the mapping relation between the business types and the application layer IDs.

Figure 9:
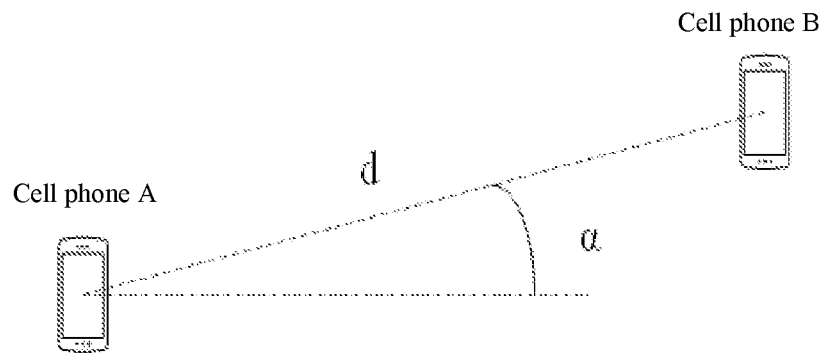
FIG. 9 is a schematic diagram of relative positioning according to an example embodiment.

In an embodiment of the disclosure, a ranging method for a terminal is provided. In an embodiment of the disclosure, the ranging method can be performed alone or in combination with any one of the embodiments of the disclosure. In an embodiment, the terminal is a first terminal, and the first terminal performing the ranging may refer to measuring the relative position between the first terminal and the second terminal. In an embodiment, measuring the relative position between the first terminal and the second terminal may be measuring a distance between the first terminal and the second terminal and/or measuring an azimuth of the second terminal relative to the first terminal. For example, as shown in FIG. 9, the first terminal is cell phone A and the second terminal is cell phone B. Measuring the relative position between the cell phone A and the cell phone B may be measuring a distance d between the cell phone A and the cell phone B and an azimuth a of the cell phone B relative to the cell phone A, in which the azimuth a may be an AOA or an AOD.

In an embodiment, the cell phone A can determine the relative position between the cell phone A and the cell phone B by obtaining the relative distance d of the cell phone A relative to the cell phone B and the AOA a of the signal sent by the cell phone B arriving at the cell phone A. In an embodiment, the cell phone A can determine the relative position of the cell phone B relative to the cell phone A by obtaining the relative distance of the cell phone A relative to the cell phone B and the AOD a of the signal sent by the cell phone A.

In an embodiment, the relative position between the terminals can be measured by sidelink wireless communication.

In an embodiment, as shown in FIG. 8, the terminal is the first terminal, the first terminal is the cell phone A, and the second terminal is the cell phone B. When performing the relative positioning between the cell phone A and the cell phone B, the cell phone A sends an initial ranging signal based on the sidelink wireless communication. After receiving the initial ranging signal, the cell phone B feeds back a feedback ranging signal. The cell phone A calculates the relative distance d between the cell phone A and the cell phone B based on the time difference between sending the initial ranging signal and receiving the feedback ranging signal. The cell phone A calculates the relative angle α by measuring the AOA of the feedback ranging signal. The relative positioning between the cell phone A and the cell phone B is performed based on the relative distance d and the relative angle α. Therefore, the relative position between the cell phone A and the cell phone B can be determined.

In an embodiment of the disclosure, a ranging method for a terminal is provided. The ranging method of the embodiment of the disclosure may be performed alone or in combination with any one of the embodiments of the disclosure. The ranging method of the embodiment of the disclosure includes: in response to a terminal establishing a Radio Resource Control (RRC) connection with a base station, the terminal receiving a ranging authorization policy sent by the base station. In this way, when the terminal needs to initiate ranging, it can determine whether to perform the ranging based on the received ranging authorization policy sent by the base station. When the ranging authorization policy indicates that the terminal does not have permission to perform ranging, the terminal is not able to initiate the ranging. When the ranging authorization policy indicates that the terminal has permission to perform ranging, the terminal can initiate the ranging.

In an embodiment, the ranging authorization policy may be sent based on a request from the terminal. That is, in response to the terminal requiring to initiate ranging, the terminal sends an acquisition request to the base station to obtain the ranging authorization policy. The base station sends the ranging authorization policy to the terminal in response to the acquisition request. After receiving the ranging authorization policy from the base station, the terminal performs the ranging based on the received ranging authorization policy from the base station. When the ranging authorization policy indicates that the terminal does not have permission to perform ranging, the terminal cannot initiate the ranging. When the ranging authorization policy indicates that the terminal has permission to perform ranging, the terminal can initiate the ranging. In another embodiment, the ranging authorization policy may be sent based on a communication protocol regulation. That is, the base station sends the ranging authorization policy to the terminal when a condition specified in the communication protocol regulation is satisfied.

In an embodiment, when an application for ranging in the terminal is started, the acquisition request for obtaining the ranging authorization policy is sent to the base station. In another embodiment, when the terminal receives an instruction for triggering ranging from a user, it sends the acquisition request for obtaining the ranging authorization policy to the base station. In yet another embodiment, when the terminal satisfies the condition specified in the communication protocol regulation (e.g., when a preset time or a preset loading is reached), it sends the acquisition request for obtaining the ranging authorization policy to the base station.

In an embodiment, the terminal receives the ranging authorization policy sent by the base station via a broadcast message. Alternatively, the terminal receives the ranging authorization policy sent by the base station via an RRC reconfiguration message. Here, the base station sends the ranging authorization policy via an existing broadcast message or the RRC reconfiguration message, thereby improving the signaling compatibility of the broadcast message or the RRC reconfiguration message.

Figure 10:
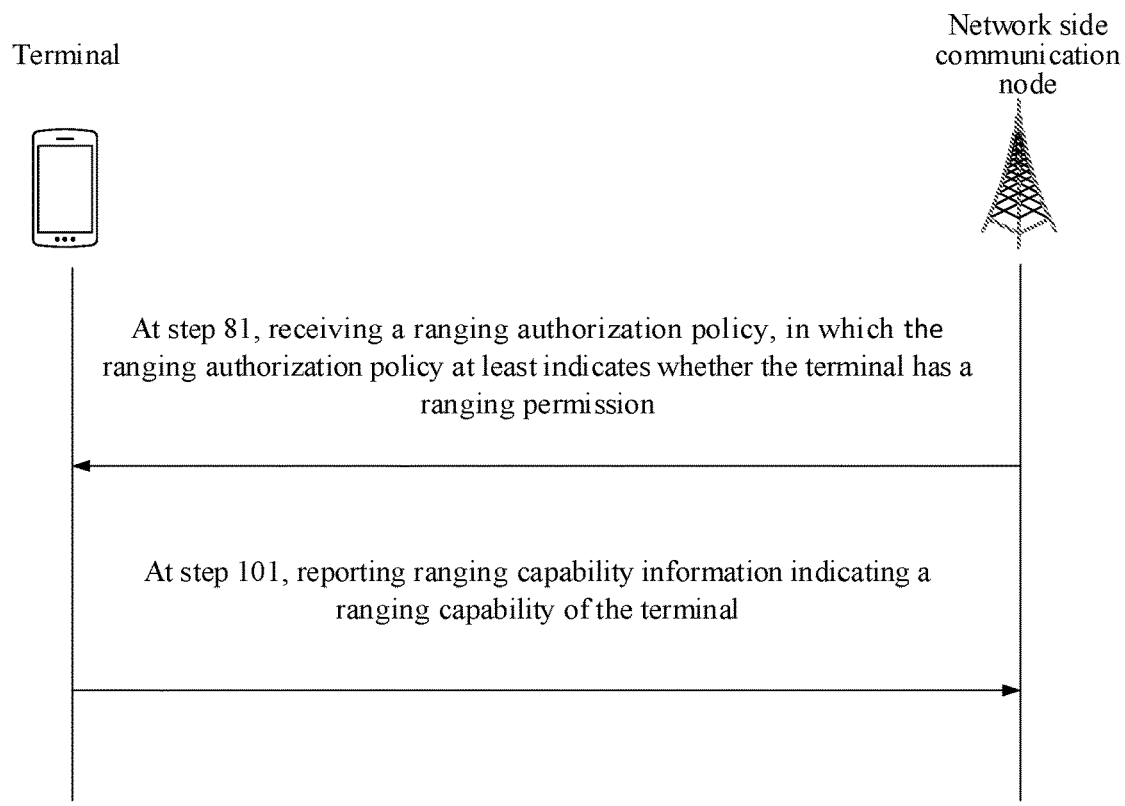
FIG. 10 is a flowchart of a communication method according to an example embodiment.

As shown in FIG. 10, a communication method is provided in this embodiment. The method further includes the following steps.

At step 101, ranging capability information indicating a ranging capability of the terminal is reported.

In an embodiment, reporting the ranging capability information indicating the ranging capability of the terminal includes: sending a registration request message carrying the ranging capability information indicating the ranging capability of the terminal. Here, the registration request message is used to send the ranging capability information, which may improve the compatibility of the registration request message.

In an embodiment, the ranging capability information includes at least one of:
  an indication indicating that the terminal supports ranging or an indication indicating that the terminal does not support ranging;
  a ranging accuracy related indication including at least one of: an indication indicating that the terminal supports ranging with a ranging accuracy greater than an accuracy threshold; an indication indicating that the terminal does not support ranging with a ranging accuracy greater than an accuracy threshold; or an indication indicating a ranging accuracy level supported by the terminal and an indication indicating a ranging accuracy range supported by the terminal; in which the ranging accuracy includes at least one of: an angle measurement accuracy or a distance measurement accuracy;
  an indication indicating that the terminal supports angle measurement or an indication indicating that the terminal does not support angle measurement;
  an indication indicating a carrier frequency supported by the terminal for ranging;
  an indication indicating antenna information used by the terminal for ranging;
  an indication indicating a ranging mode supported by the terminal, including at least one of: an indication indicating a unilateral ranging mode supported by the terminal or an indication indicating a bilateral ranging mode supported by the terminal, in which the unilateral ranging mode is a mode of performing ranging based on a ranging signal sent by one of two terminals involved in the ranging, and the bilateral ranging mode is a mode of performing ranging based on ranging signals sent by both terminals involved in the ranging; or
  an indication indicating an angle measurement mode supported by the terminal, including at least one of: an indication indicating that the terminal supports measurement of an AOA or an indication indicating that the terminal supports measurement of an AOD, in which the AOA is an angle between a signal receiving direction of a receiving antenna and a reference direction, and the AOD is an angle between a signal transmitting direction of a transmitting antenna and the reference direction.

In an embodiment, the base station receives the ranging capability information sent by the terminal, and when the ranging capability information indicates that the terminal supports ranging, the indication for permission of initiating ranging can be set to a first indication. When the ranging capability information indicates that the terminal does not support ranging, the indication for permission of initiating ranging is set to a second indication. In an embodiment, when the indication for permission of initiating ranging is the first indication, the terminal is allowed to initiate the ranging between the terminals actively, i.e., the terminal has the permission to initiate ranging between the terminals actively. When the indication for permission of initiating ranging is the second indication, the terminal is forbidden to actively initiate the ranging between the terminals, i.e., the terminal does not have the permission to actively initiate ranging between the terminals. Here, initiating the ranging between the terminals actively may refer to the terminal sending a ranging request message to another terminal to request the another terminal to perform the ranging.

In an embodiment, when the accuracy required by the ranging business of the terminal is greater than a preset accuracy threshold, the indication for ranging accuracy permission indicates that the terminal has the permission to perform ranging with a ranging accuracy greater than the accuracy threshold. When the accuracy required by the ranging business of the terminal is less than the preset accuracy threshold, the indication for ranging accuracy permission indicates that the terminal does not have the permission to perform ranging with a ranging accuracy greater than the accuracy threshold.

In an embodiment, the terminal may obtain ranging data with different accuracies by using different accuracy levels for ranging. The higher the accuracy level used by the terminal, the higher the accuracy of the data obtained. For example, the error between the ranging data obtained using the first accuracy level for ranging and the actual data is less than a, and the error between the ranging data obtained using the second accuracy level for ranging and the actual data is less than b. Here, a<b, and the first accuracy level is higher than the second accuracy level.

In an embodiment, the accuracy of the ranging data obtained within different accuracy ranges may be different. The higher the accuracy corresponding to the accuracy range used by the terminal, the higher the accuracy of the obtained ranging data. For example, the first accuracy range is [c, d] and the second accuracy range is [e, f], in which c<e. The accuracy of the ranging data obtained within the first accuracy range is greater than the accuracy of the ranging data obtained within the second accuracy range.

In an embodiment, when the terminal supports angle measurement, the indication for angle measurement permission indicates that the terminal has the permission to perform angle measurement. When the terminal does not support angle measurement, the indication for angle measurement permission indicates that the terminal does not have the permission to perform angle measurement.

In an embodiment, the indication for antenna information may indicates a number of antennas.

In an embodiment, when the terminal supports the unilateral ranging mode and the time delay required by the ranging business of the terminal is less than the time delay threshold, the indication for ranging mode permission indicates that the ranging is performed using the unilateral ranging mode. When the terminal supports the bilateral ranging mode and the time delay required by the ranging business of the terminal can be greater than the time delay threshold, the indication for ranging mode permission indicates that the ranging is performed using the bilateral ranging mode.

In an embodiment, when the terminal supports the bilateral ranging mode and the error required by the ranging business of the terminal is less than the error threshold, the indication for ranging mode permission indicates that the ranging is performed using the bilateral ranging mode. When the terminal supports the unilateral ranging mode and the error required by the ranging business of the terminal can be greater than the error threshold, the indication for ranging mode permission indicates that the ranging is performed using the unilateral ranging mode.

In an embodiment, as shown in FIG. 4, the reference direction is the direction perpendicular to the normal line direction of the terminal.

Figure 11:
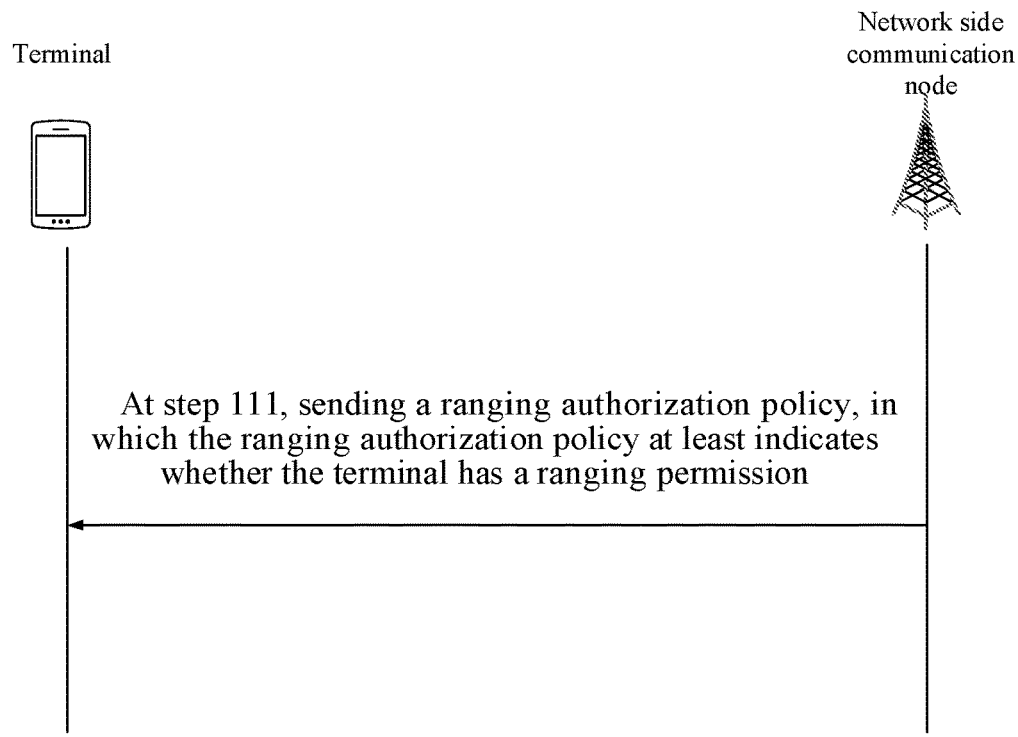
FIG. 11 is a flowchart of a communication method according to an example embodiment.

As shown in FIG. 11, a communication method, applied to a network side communication node, is provided in this embodiment. The method includes the following steps.

At step 111, a ranging authorization policy is sent.

The ranging authorization policy at least indicates whether the terminal has a ranging permission.

The terminal may be, but is not limited to, a cell phone, a wearable device, a vehicle terminal, an RSU, a smart home terminal, an industrial sensing device, and/or a medical device.

In an embodiment, the ranging authorization policy may be a ranging authorization policy sent by a base station. The base station is an interface device for the terminal to access the network. The base station may be a base station of various types, e.g., a 3G base station, a 4G base station, a 5G base station, or other evolved base stations.

In an embodiment, the ranging authorization policy can be sent by an evolved network side communication node. The communication node can be an AMF entity and a PCF entity in a 5G network.

In an embodiment, the terminal is a first terminal, and the first terminal performing the ranging may refer to measuring a relative position between the first terminal and a second terminal. In an embodiment, measuring the relative position between the first terminal and the second terminal may be measuring a distance between the first terminal and the second terminal and/or an azimuth of the second terminal relative to the first terminal. For example, as shown in FIG. 8, the first terminal is cell phone A and the second terminal is cell phone B. Measuring the relative position between the cell phone A and the cell phone B may be measuring the distance d between the cell phone A and the cell phone B and the azimuth a of the cell phone B relative to the cell phone A. The azimuth a may be an AOA or an AOD.

In an embodiment, the cell phone A determines the relative position of the cell phone B relative to the cell phone A by obtaining the relative distance d of the cell phone A relative to the cell phone B and the AOA a of the signal sent by the cell phone B arriving at the cell phone A. In an embodiment, the cell phone A determines the relative position of the cell phone B relative to the cell phone A by obtaining the relative distance of the cell phone A relative to the cell phone B and the AOD a of the signal sent by the cell phone A.

In an embodiment, the relative position between the terminals can be measured by sidelink wireless communication.

In an embodiment, with reference to FIG. 8 again, the terminal is the first terminal, the first terminal is the cell phone A, and the second terminal is the cell phone B. When performing the relative positioning between the cell phone A and the cell phone B, the cell phone A sends an initial ranging signal based on the sidelink wireless communication. After receiving the initial ranging signal, the cell phone B feeds back a feedback ranging signal. The cell phone A calculates the relative distance d between the cell phone A and the cell phone B based on the time difference between sending the initial ranging signal and receiving the feedback ranging signal. The cell phone A calculates the relative angle α by measuring the AOA of the feedback ranging signal. The relative distance d and the relative angle α are used to perform the relative positioning between the cell phone A and the cell phone B. The relative position between the cell phone A and the cell phone B is determined.

In an embodiment, in response to establishing an RRC connection between the terminal and the base station, the terminal receives the ranging authorization policy from the base station. In this way, when the terminal needs to initiate ranging, it can determine whether to perform the ranging based on the received ranging authorization policy sent by the base station. When the ranging authorization policy indicates that the terminal does not have a ranging permission, the terminal cannot initiate the ranging. When the ranging authorization policy indicates that the terminal has a ranging permission, the terminal can initiate the ranging.

In an embodiment, when the terminal needs to initiate ranging, it sends an acquisition request to the base station to obtain the ranging authorization policy. The base station sends the ranging authorization policy to the terminal in response to the acquisition request. After receiving the ranging authorization policy from the base station, the terminal performs the ranging based on the received ranging authorization policy from the base station. When the ranging authorization policy indicates that the terminal does not have a ranging permission, the terminal cannot initiate the ranging. When the ranging authorization policy indicates that the terminal has a ranging permission, the terminal can initiate the ranging.

In an embodiment, when an application for ranging in the terminal is started, the acquisition request for obtaining the ranging authorization policy is sent to the base station. In another embodiment, when the terminal receives an instruction for triggering ranging from a user, it sends the acquisition request for obtaining the ranging authorization policy to the base station.

In an embodiment, the terminal receives the ranging authorization policy sent by the base station via a broadcast message. Alternatively, the terminal receives the ranging authorization policy sent by the base station via an RRC reconfiguration message. Here, the base station sends the ranging authorization policy via the existing broadcast message or the RRC reconfiguration message, which improves the signaling compatibility of the broadcast message or the RRC reconfiguration message.

In an embodiment, the ranging authorization policy may include at least an authorization indication, and the authorization indication at least indicates whether the ranging permission is available.

In the embodiment, after receiving the ranging authorization policy, the terminal is able to initiate ranging when the ranging authorization policy indicates that the terminal has the ranging permission. When the ranging authorization policy indicates that the terminal does not have the ranging permission, the terminal is not able to initiate ranging. Compared with the mode that the ranging can be initiated without considering the ranging authorization policy, on the one hand, the ranging is initiated according to the indication of the ranging authorization policy, since the terminal needs to be authorized to initiate the ranging, the occupation of wireless resources for the ranging initiated by a large number of unauthorized terminals can be reduced. On the other hand, the terminal initiates the ranging according to the indication of the ranging authorization policy, which can reduce the interference to the wireless communication channels of other terminals that perform the ranging caused by the terminal initiating the ranging at any time without authorization.

In an embodiment, the ranging authorization policy includes at least one of:
- a permission indication, indicating at least the ranging permission;
- a business indication, indicating at least a ranging related business; or
- an indication for a first effective time, indicating an effective time of the ranging authorization policy.

In an embodiment, the permission indication may indicate the ranging permission possessed by the terminal. The ranging permission may indicate whether the terminal can initiate ranging actively, or whether the terminal can initiate ranging passively, or other ranging related permissions. The permission indication can specify for authorization indication which ranging permission the terminal has when the terminal has the ranging permission.

In another embodiment, the ranging authorization policy may not include the aforementioned authorization indication, and may indirectly and implicitly indicate that the terminal has the ranging permission directly through the permission indication.

In an embodiment, the business indication may indicate different business types, which may be business types with different business characteristics, such as, a business type with a business characteristic of requiring security protection and a business type with a business characteristic of requiring privacy protection. In an embodiment, when a business requires security protection and/or privacy protection, a secure connection is used for ranging. For example, a secure unicast connection established based on PC5 interfaces is used for ranging. When the business does not require security protection and privacy protection, a connection other than the secure connection can be used for ranging.

In an embodiment, the effective time includes an effective time point of the ranging authorization policy and an ineffective time point of the ranging authorization policy. For example, the effective time point of the ranging authorization policy is 12:30, and the ineffective time point of the ranging authorization policy is 14:30.

In an embodiment, the effective time includes the effective time point of the ranging authorization policy and an effective duration. For example, the effective time point of the ranging authorization policy is 12:30, and the effective duration is 2 hours.

In an embodiment, the permission indication includes at least one of:
- an indication for permission of initiating ranging, indicating whether permission to actively initiate ranging between terminals is available;
- an indication for permission of monitoring ranging, indicating whether permission to monitor a ranging request sent by another terminal other than the terminal is available;
- an indication for distance measurement permission, indicating whether permission to perform distance measurement is available;
- an indication for angle measurement permission, indicating whether permission to perform angle measurement is available;
- an indication for ranging accuracy permission, indicating whether permission to perform ranging with a ranging accuracy greater than an accuracy threshold is available;
- an indication for ranging range permission, indicating permission to perform ranging within a preset ranging range;

an indication for carrier frequency permission, indicating permission to use a carrier frequency for ranging;

an indication for ranging mode permission, indicating permission to use a unilateral ranging mode or a bilateral ranging mode for ranging; or an indication for wireless resource permission, indicating permission to use a wireless resource for ranging when there is no NR signal coverage.

In an embodiment, when the ranging initiation permission indication is a first indication, the terminal is allowed to initiate ranging between the terminals actively, i.e., the terminal has the permission to initiate ranging between the terminals actively. When the indication for permission of initiating ranging is a second indication, the terminal is forbidden to initiate ranging between the terminals actively, i.e., the terminal does not have the permission to initiate ranging between the terminals actively. The operation of actively initiating the ranging between the terminals may be an operation in which a terminal sends a ranging request message to another terminal to request the another terminal to perform ranging.

In an embodiment, the network side communication node may store an authorization list of IDs of terminals that can initiate ranging. The terminals corresponding to the IDs have the permission to initiate ranging between the terminals actively. If the ID of the terminal that requests to initiate the ranging is in the authorization list, the indication for permission of initiating ranging is set to the first indication. If the ID of the terminal that requests to initiate the ranging is not in the authorization list, the indication for permission of initiating ranging is set to the second indication. In this way, it is possible to prohibit the unauthorized terminal from initiating the ranging between the terminals, thereby reducing the occupation of wireless resources for ranging. Meanwhile, ranging can be initiated only after the terminal is authorized, which can reduce the interference to the wireless communication channels of other terminals that perform the ranging caused by the terminal initiating the ranging at any time without authorization.

In an embodiment, the terminal sends ranging capability information to the base station, and the base station can receive the ranging capability information sent by the terminal. When the ranging capability information indicates that the terminal supports ranging, the indication for permission of initiating ranging can be set to the first indication. When the ranging capability information indicates that the terminal does not support ranging, the indication for permission of initiating ranging is set to the second indication.

In an embodiment, when the indication for permission of monitoring ranging is a first indication, the terminal is allowed to monitor the ranging request sent by another terminal other than the terminal, i.e., the terminal has the permission to monitor the ranging request sent by another terminals other than the terminal. When the indication for permission of monitoring ranging is a second indication, the terminal is forbidden to monitor the ranging request sent by another terminal other than the terminal, i.e., the terminal does not have the permission to monitor the ranging request sent by another terminal other than the terminal. In an embodiment, in response to the base station having the permission to monitor the ranging request sent by another terminal other than the terminal, the base station can perform the ranging when the ranging request is monitored.

In an embodiment, the network side communication node may store an authorization list of IDs of terminals that can monitor the ranging request sent by another terminal other than the terminal. Each of the terminals corresponding to the IDs has the permission to monitor the ranging request sent by another terminals other than the terminal. When the ID of the terminal that requests to monitor another terminal other than the terminal is in the authorization list, the indication for permission of monitoring ranging is set to the first indication. When the ID of the terminal that requests to monitor a ranging request sent by another terminal other than the terminal is not in the authorization list, the indication for permission of monitoring ranging is set to the second indication. In this way, it is possible to prohibit an unauthorized terminal from monitoring the ranging request sent by another terminal other than the terminal, thereby reducing the occupation of wireless resources for ranging. Meanwhile, the security of information transmission can be ensured since only the authorized terminal can monitor the ranging request sent by another terminal other than the terminal.

In an embodiment, when the terminal supports distance measurement, the indication for distance measurement permission indicates that the terminal has permission to perform distance measurement. When the terminal does not support distance measurement, the indication for distance measurement permission indicates that the terminal does not have the permission to perform distance measurement.

In an embodiment, when the terminal supports angle measurement, the indication for angle measurement permission indicates that the terminal has permission to perform angle measurement. When the terminal does not support angle measurement, the indication for angle measurement permission indicates that the terminal does not have the permission to perform angle measurement.

In an embodiment, when the terminal supports both distance measurement and angle measurement, the indication for distance measurement permission indicates that the terminal has the permission to perform distance measurement, and the indication for angle measurement permission indicates that the terminal has the permission to perform angle measurement.

In an embodiment, when the terminal supports distance measurement but does not support angle measurement, the indication for distance measurement permission indication that the terminal has the permission to perform distance measurement, and the indication for angle measurement permission indicates that the terminal does not have the permission to perform angle measurement.

In an embodiment, when the terminal does not support distance measurement but supports angle measurement, the indication for distance measurement permission indicates that the terminal does not have the permission to perform distance measurement, and the indication for angle measurement permission indicates that the terminal has the permission to perform angle measurement.

In an embodiment, when the terminal supports neither distance measurement nor angle measurement, the indication for distance measurement permission indicates that the terminal does not have the permission to perform distance measurement, and the indication for angle measurement permission indicates that the terminal does not have the permission to perform angle measurement.

In an embodiment, when the indication for angle measurement mode permission is a first indication, it indicates that the terminal has the permission to perform angle measurement by measuring the AOA. When the indication for angle measurement mode permission is a second indication, it indicates that the terminal has the permission to perform angle measurement by measuring the AOD. In an embodiment, as shown in FIG. 4, the reference direction for measuring the AOA and measuring the AOD can be perpendicular to the normal line direction of the terminal.

In an embodiment, when the accuracy required by the ranging business of the terminal is greater than the preset accuracy threshold, the indication for ranging accuracy permission indicates that the terminal has permission to perform ranging with the ranging accuracy greater than the accuracy threshold. When the accuracy required by the ranging business of the terminal is less than the preset accuracy threshold, the indication for ranging accuracy permission indicates that the terminal does not have the permission to perform ranging with a ranging accuracy greater than the accuracy threshold.

In an embodiment, the terminal may obtain ranging data with different accuracies by using different accuracy levels for ranging. The higher the accuracy level used by the terminal, the higher the accuracy of the data obtained. For example, the error between ranging data obtained using the first accuracy level for ranging and the actual data is less than a, and the error between the ranging data obtained using the second accuracy level for ranging and the actual data is less than b. Here, a<b, and the first accuracy level is higher than the second accuracy level.

In an embodiment, the accuracy of the ranging data obtained within different accuracy ranges may be different. The higher the accuracy corresponding to the accuracy range used by the terminal, the higher the accuracy of the obtained ranging data. For example, the first accuracy range is [c, d] and the second accuracy range is [e, f], in which c<e. The accuracy of the ranging data obtained within the first accuracy range is greater than the accuracy of the ranging data obtained within the second accuracy range.

In an embodiment, the carrier frequency may be a communication frequency for ranging between the terminals using a sidelink. Since the carrier frequency is uniformly indicated by the indication for carrier frequency permission, the resources can be scheduled by the a unified resource scheduling algorithm, which can timely reduce the interference among transmission channels caused by resource collision when using the sidelink wireless communication for relative positioning between different terminals, thereby improving the channel communication quality and ensuring the accuracy of relative positioning.

In an embodiment, the carrier frequency is selected from a pre-configured positioning resource pool, which reduces the resource collision and ensures the accuracy of relative positioning.

In an embodiment, when a time delay required by the ranging business of the terminal is less than the time delay threshold, the indication for ranging mode permission indicates that the ranging is performed using the unilateral ranging mode. When the time delay required by the ranging business of the terminal can be greater than the time delay threshold, the indication for ranging mode permission indicates that the ranging is performed using the bilateral ranging mode.

In an embodiment, when the error required by the ranging business of the terminal is less than the error threshold, the indication for ranging mode permission indicates that the ranging is performed using the bilateral ranging mode. When the error required by the ranging business of the terminal can be greater than the error threshold, the indication for ranging mode permission indicates that the ranging is performed using the unilateral ranging mode.

In an embodiment, the indication for wireless resource permission may indicate that the terminal uses unauthorized spectrum resources for ranging when there is no NR signal coverage, which avoids the situation that the terminal cannot perform the ranging when it is not located in an NR signal coverage area.

In an embodiment, the indication for wireless resource permission may indicate unauthorized spectrum resources used when there is no NR signal coverage.

In an embodiment, the permission indication further includes an indication for angle measurement mode permission, and the indication for angle measurement mode permission indicates at least one of:
 whether permission to perform angle measurement by measuring an AOA is available, in which the AOA is an angle between a signal receiving direction of a receiving antenna and a reference direction;
 or,
 whether permission to perform angle measurement by measuring an AOD is available, in which the AOD is an angle between a signal transmitting direction of a transmitting antenna and the reference direction.

In an embodiment, when the indication for angle measurement mode permission is a first indication, it indicates that the terminal has the permission to perform angle measurement by measuring the AOA. When the indication for angle measurement mode permission is a second indication, it indicates that the terminal has the permission to perform angle measurement by measuring the AOD. In an embodiment, as shown in FIG. 4, the reference direction for measuring the AOA and measuring the AOD can be the direction perpendicular to the normal line direction of the terminal.

In an embodiment, the ranging accuracy includes at least one of:
 an angle measurement accuracy; or
 a distance measurement accuracy.

In an embodiment, the permission indication further includes at least one of:
 an indication for accuracy level permission, indicating permission to perform ranging based on an angle measurement accuracy level; or
 an indication for accuracy range permission, indicating permission to perform ranging within an accuracy range.

In an embodiment, when the accuracy required by the ranging business of the terminal is greater than the preset accuracy threshold, the indication for ranging accuracy permission indicates that the terminal has the permission to perform ranging with the ranging accuracy greater than the accuracy threshold. When the accuracy required by the ranging business of the terminal is less than the preset accuracy threshold, the indication for ranging accuracy permission indicates that the terminal does not to have the permission to perform ranging with the ranging accuracy greater than the accuracy threshold.

In an embodiment, the terminal may obtain ranging data with different accuracies by using different accuracy levels for ranging. The higher the accuracy level used by the terminal, the higher the accuracy of the data obtained. For example, the error between the ranging data obtained using the first accuracy level for ranging and the actual data is less than a, and the error between ranging data obtained using the second accuracy level for ranging and the actual data is less than b. Here, a<b, and the first accuracy level is higher than the second accuracy level.

In an embodiment, the accuracy of the ranging data obtained within different accuracy ranges may be different. The higher the accuracy corresponding to the accuracy range used by the terminal, the higher the accuracy of the obtained ranging data. For example, the first accuracy range is [c, d] and the second accuracy range is [e, f], in which c<e. The accuracy of the ranging data obtained within the first accuracy range is greater than the accuracy of the ranging data obtained within the second accuracy range.

In an embodiment, the unilateral ranging mode is a mode of performing ranging based on a ranging signal sent by one of two terminals involved in the ranging, and the bilateral ranging mode is a mode of performing ranging based on ranging signals sent by both terminals involved in the ranging.

In an embodiment, when the time delay required by the ranging business of the terminal is less than the time delay threshold, the indication for ranging mode permission indicates that the ranging is performed using the unilateral ranging mode. When the time delay required by the ranging business of the terminal can be greater than the time delay threshold, the indication for ranging mode permission indicates that the ranging is performed using the bilateral ranging mode.

In an embodiment, when the error required by the ranging business of the terminal is less than the error threshold, the indication for ranging mode permission indicates that the ranging is performed using the bilateral ranging mode. When the error required by the ranging business of the terminal can be greater than the error threshold, the indication for ranging mode permission indicates that the ranging is performed using the unilateral ranging mode.

In an embodiment, the business indication includes at least one of:
  an indication for a privacy protection business, indicating a business for which privacy protection is performed;
  an indication for a second effective time, indicating a time to conduct privacy protection on the business for which privacy protection is performed;
  an indication for a security protection business, indicating a business for which security protection is performed;
  an indication for a third effective time, indicating a time to conduct security protection on the business for which security protection is performed;
  an indication for a first mapping relation, indicating a mapping relation between business types and carrier frequencies used for ranging; or
  an indication for a second mapping relation, indicating a mapping relation between business types and application layer IDs.

In an embodiment, the privacy protection business may be a business whose identity information needs to be protected during the course of business. For example, the identity information can be type information of the business and ID information of the terminal of the business.

In an embodiment, the security protection business may be a business whose data transmitted during the course of business needs to be protected.

In an embodiment, the first effective time and the second effective time include the effective time point of the ranging authorization policy and the ineffective time point of the ranging authorization policy. For example, the effective time point of the ranging authorization policy is 12:30, and the ineffective time point of the ranging authorization policy is 14:30.

In an embodiment, the first effective time and the second effective time include the effective time point of the ranging authorization policy and the effective duration. For example, the effective time point of the ranging authorization policy is 12:30, and the effective duration is 2 hours.

In an embodiment, the terminal can select the carrier frequency with less interference for ranging according to the mapping relation between the business types and the carrier frequencies used for ranging, to improve the accuracy of ranging.

In an embodiment, the terminal can determine the application layer ID for each type of business based on the mapping relation between the business types and the application layer IDs.

Figure 12:
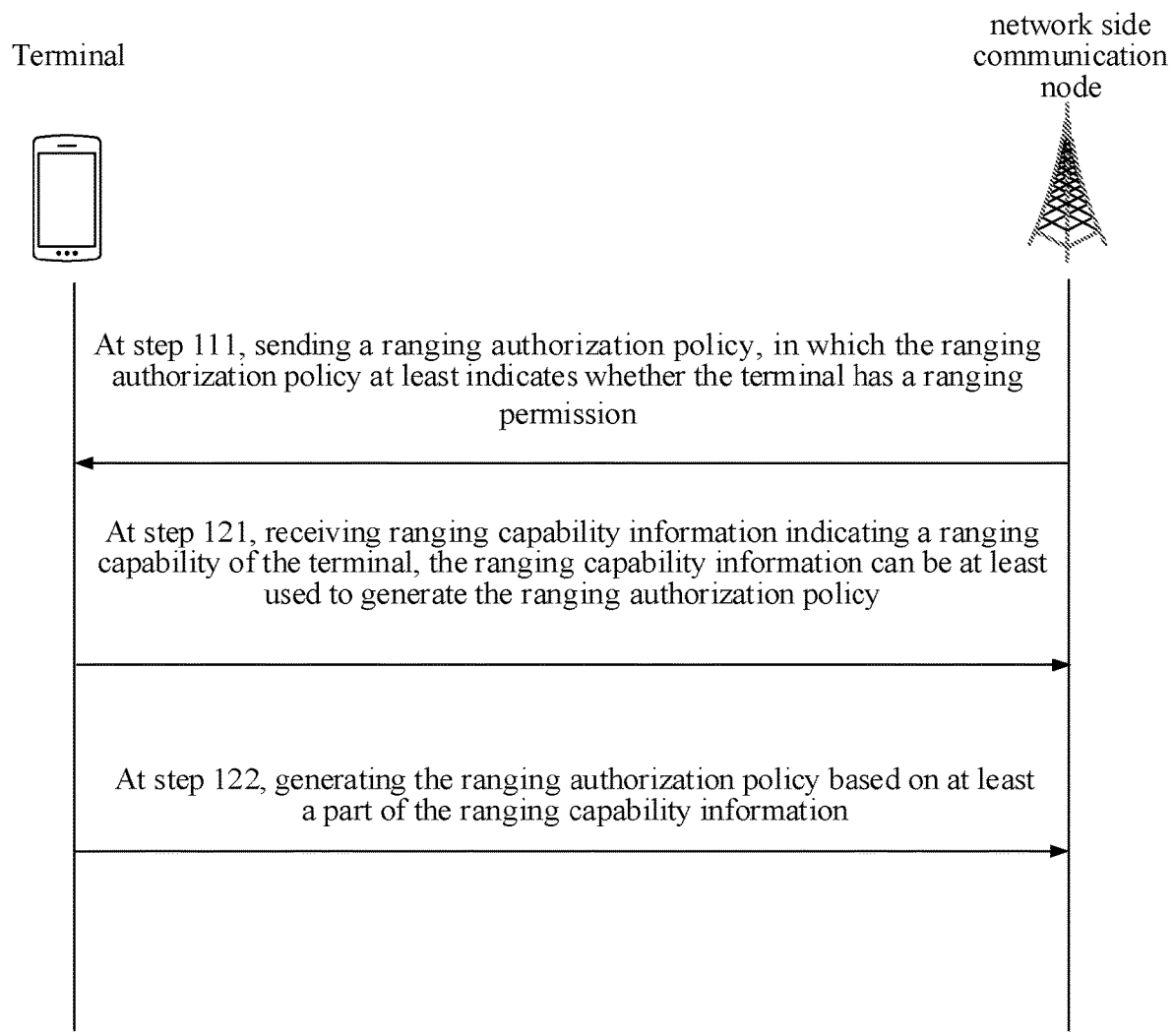
FIG. 12 is a flowchart of a communication method according to an example embodiment.

As shown in FIG. 12, a communication method is provided in the embodiment. The method includes the following steps.

At step 121, ranging capability information indicating a ranging capability of the terminal is received.

At step 122, the ranging authorization policy is generated based on at least a part of the ranging capability information.

In an embodiment, the ranging capability information indicating the ranging capability of the terminal is a registration request message indicating the ranging capability of the terminal. The registration request message is used to send the ranging capability information, to enhance the compatibility of the registration request message.

In an embodiment, the ranging capability information includes at least one of:
  an indication indicating that the terminal supports ranging or an indication indicating that the terminal does not support ranging;
  a ranging accuracy related indication, including: an indication indicating that the terminal supports ranging with a ranging accuracy greater than an accuracy threshold; an indication indicating that the terminal does not support ranging with a ranging accuracy greater than an accuracy threshold; an indication indicating a ranging accuracy level supported by the terminal and/or an indication indicating a ranging accuracy range supported by the terminal; in which the ranging accuracy includes: an angle measurement accuracy and/or a distance measurement accuracy;
  an indication indicating that the terminal supports angle measurement or an indication indicating that the terminal does not support angle measurement;
  an indication indicating a carrier frequency supported by the terminal for ranging;
  an indication indicating antenna information used by the terminal for ranging;
  an indication indicating a ranging mode supported by the terminal, including: an indication indicating a unilateral ranging mode supported by the terminal and/or an indication indicating a bilateral ranging mode supported by the terminal, in which the unilateral ranging mode is a mode of performing ranging based on a ranging signal sent by one of two terminals involved in the ranging, and the bilateral ranging mode is a mode of performing ranging based on ranging signals sent by both terminals involved in the ranging; or
  an indication indicating an angle measurement mode supported by the terminal, including: an indication indicating that the terminal supports measurement of an AOA and/or an indication indicating that the terminal supports measurement of an AOD, in which the AOA is an angle between a signal receiving direction of a receiving antenna and a reference direction, and the AOD is an angle between a signal transmitting direction of a transmitting antenna and the reference direction.

In an embodiment, the base station receives the ranging capability information sent by the terminal, and when the ranging capability information indicates that the terminal supports ranging, the indication for permission of initiating ranging can be set to a first indication. When the ranging capability information indicates that the terminal does not support ranging, the indication for permission of initiating ranging is set to a second indication. In an embodiment, when the indication for permission of initiating ranging is the first indication, the terminal is allowed to initiate the ranging between the terminals actively, i.e., the terminal has the permission to initiate ranging between the terminals actively. When the indication for permission of initiating ranging is the second indication, the terminal is forbidden to actively initiate the ranging between the terminals, i.e., the terminal does not have the permission to actively initiate ranging between the terminals.

In an embodiment, when the accuracy required by the ranging business of the terminal is greater than the preset accuracy threshold, the indication for ranging accuracy permission indicates that the terminal has the permission to perform ranging with the ranging accuracy greater than the accuracy threshold. When the accuracy required by the ranging business of the terminal is less than the preset accuracy threshold, the indication for ranging accuracy permission indicates that the terminal does not have the permission to perform ranging with a ranging accuracy greater than the accuracy threshold.

In an embodiment, the terminal may obtain ranging data with different accuracies by using different accuracy levels for ranging. The higher the accuracy level used by the terminal, the higher the accuracy of the data obtained. For example, the error between the ranging data obtained using the first accuracy level for ranging and the actual data is less than a, and the error between the ranging data obtained using the second accuracy level for ranging and the actual data is less than b. Here, a<b, and the first accuracy level is higher than the second accuracy level.

In an embodiment, the accuracy of the ranging data obtained within different accuracy ranges may be different. The higher the accuracy corresponding to the accuracy range used by the terminal, the higher the accuracy of the obtained ranging data. For example, the first accuracy range is [c, d] and the second accuracy range is [e, f], in which c<e. The accuracy of the ranging data obtained within the first accuracy range is greater than the accuracy of the ranging data obtained within the second accuracy range.

In an embodiment, when the terminal supports the angle measurement, the indication for angle measurement permission indicates that the terminal has the permission to perform angle measurement. When the terminal does not support the angle measurement, the indication for angle measurement permission indicates that the terminal does not have the permission to perform angle measurement.

In an embodiment, the indication for antenna information may indicates a number of antennas.

In an embodiment, when the terminal supports the unilateral ranging mode and the time delay required by the ranging business of the terminal is less than the time delay threshold, the indication for ranging mode permission indicates that the ranging is performed using the unilateral ranging mode. When the terminal supports the bilateral ranging mode and the time delay required by the ranging business of the terminal can be greater than the time delay threshold, the indication for ranging mode permission indicates that the ranging is performed using the bilateral ranging mode.

In an embodiment, when the terminal supports the bilateral ranging mode and the error required by the ranging business of the terminal is less than the error threshold, the indication for ranging mode permission indicates that the ranging is performed using the bilateral ranging mode. When the terminal supports the unilateral ranging mode and the error required by the ranging business of the terminal can be greater than the error threshold, the indication for ranging mode permission indicates that the ranging is performed using the unilateral ranging mode.

In an embodiment, as shown in FIG. 4, the reference direction is the direction perpendicular to the normal line direction of the terminal.

Figure 13:
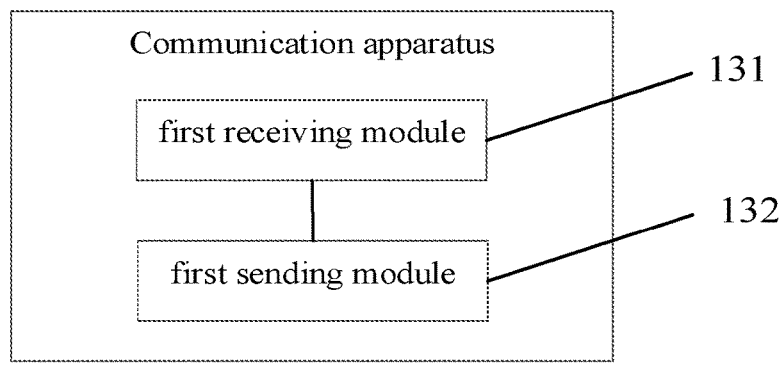
FIG. 13 is a block diagram of a communication apparatus according to an example embodiment.

As shown in FIG. 13, a communication apparatus, applied to a terminal, is provided. The apparatus includes a first receiving module 131.

The first receiving module 131 is configured to receive a ranging authorization policy.

The ranging authorization policy at least indicates whether the terminal has a ranging permission.

In an embodiment, the apparatus further includes a first sending module 132, and the first sending module 132 is configured to: report ranging capability information indicating a ranging capability of the terminal.

In an embodiment, the first sending module 132 is further configured to send a registration request message carrying the ranging capability information indicating the ranging capability of the terminal.

Figure 14:
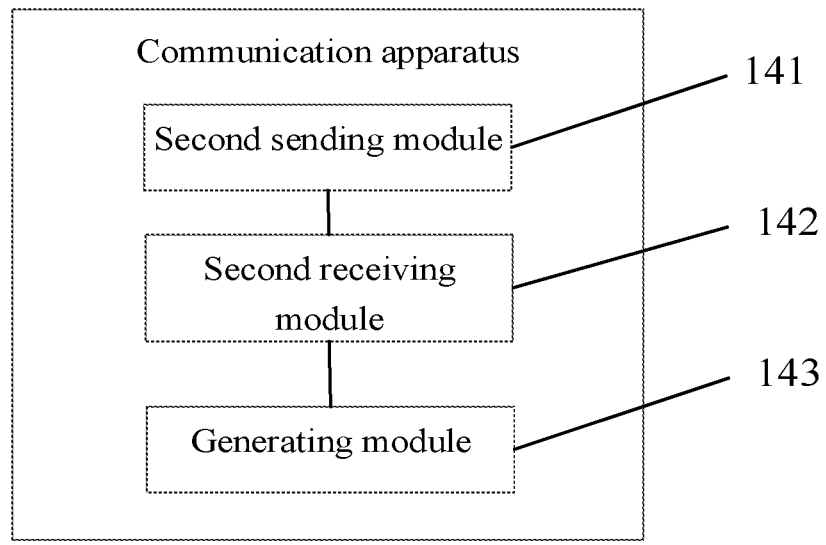
FIG. 14 is a block diagram of a communication apparatus according to an example embodiment.

As shown in FIG. 14, a communication apparatus, applied to a network side communication node, is provided. The apparatus includes a second sending module 141.

The second sending module 141 is configured to send a ranging authorization policy.

The ranging authorization policy at least indicates whether a terminal has a ranging permission.

In an embodiment, the apparatus further includes: a second receiving module 142 and a generating module 143. The second receiving module 142 is configured to receive ranging capability information indicating a ranging capability of the terminal, and the generating module 143 is configured to generate the ranging authorization policy based on at least a part of the ranging capability information.

Regarding the apparatus in the above embodiments, the specific way in which each module performs its operation has been described in detail in the embodiments related to the method, and will not be described in detail here.

The embodiment of the disclosure provides a communication device. The communication device includes:
 a processor;
 a memory for storing instructions executable by the processor; in which
 the processor is configured to implement the method applied to any embodiment of the disclosure when the executable instructions are executed.

The processor may include various types of storage medium, the storage mediums are non-transitory computer storage medium that are capable of continuing to store information thereon in the memory after the communication device is powered down.

The processor may be connected to the memory via a bus or the like for reading executable programs stored on the memory.

The embodiments of the disclosure further provide a computer storage medium. The computer storage medium stores computer executable programs, and when the computer executable programs are executed by the processor, the method of any embodiment of the disclosure is implemented.

With respect to the apparatus of the above embodiments, the specific manner in which the individual modules perform the operations has been described in detail in the embodiments related to the method, and will not be described in detail herein.

Figure 15:
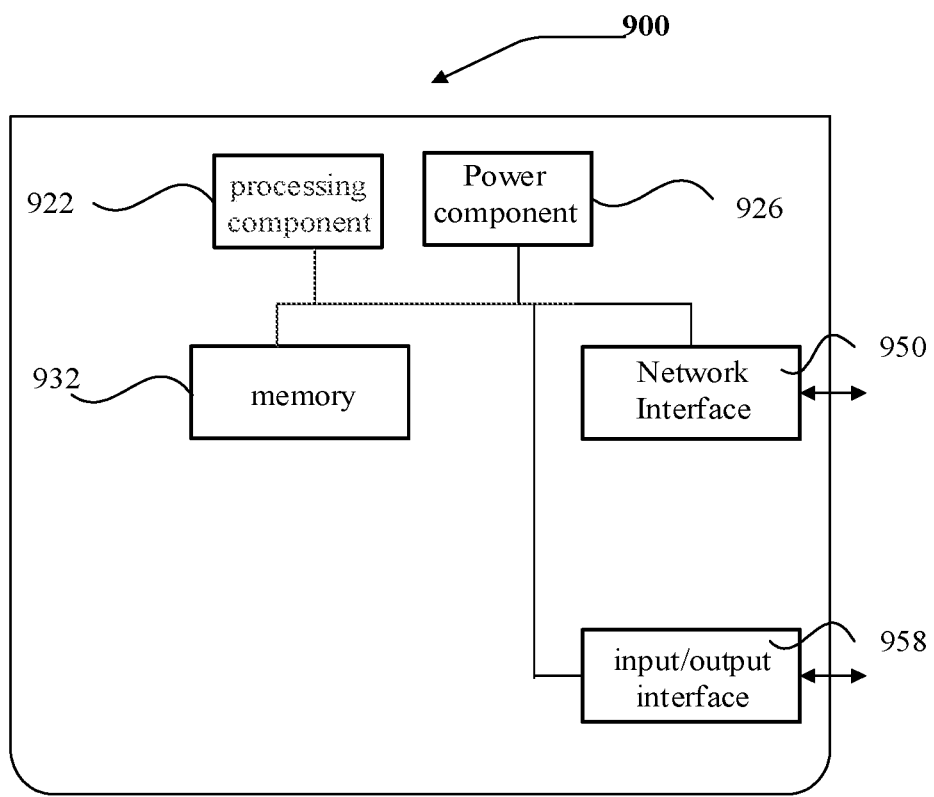
FIG. 15 is a block diagram of a base station according to an example embodiment.

As shown in FIG. 15, the embodiment of the disclosure illustrates an architecture of a base station 900. For example, the base station 900 may be provided as a network side device. As illustrated in FIG. 15, the base station 900 includes a processing component 922, which includes one or more processors, and a memory resource represented by a memory 932 for storing instructions executable by the processing component 922, such as application programs. The application program stored in the memory 932 may include one or more modules, each module corresponds to a set of instructions. In addition, the processing component 922 is configured to execute instructions to perform the method described above and applied to the base station, for example, the method shown in FIG. 11 to FIG. 12.

The base station 900 may also include a power component 926 configured to perform power management of the base station 900, a wired or wireless network interface 950 configured to connect the base station 900 to the network, and an I/O interface 958. The base station 900 may operate based on an operating system stored on the memory 932, such as Windows Server™, Mac OS X™, Unix™, Linux™ FreeBSD™ or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A communication method, comprising:
reporting, by a terminal, ranging capability information indicating a ranging capability of the terminal, wherein the ranging capability information comprises an indication indicating that the terminal supports ranging or an indication indicating that the terminal does not support ranging;
receiving, by the terminal, a ranging authorization policy;
wherein the ranging authorization policy is generated by the network side communication node based on at least a part of the ranging capability information; the ranging authorization policy at least indicates whether the terminal has a ranging permission;
wherein the ranging authorization policy comprises a permission indication, indicating at least the ranging permission, and the permission indication comprises at least one of:
an indication for permission of initiating ranging, indicating whether permission to actively initiate ranging between terminals is available;
an indication for permission of monitoring ranging, indicating whether permission to monitor a ranging request sent by another terminal other than the terminal is available;
an indication for distance measurement permission, indicating whether permission to perform distance measurement is available;
an indication for angle measurement permission, indicating whether permission to perform angle measurement is available;
an indication for ranging accuracy permission, indicating whether permission to perform ranging with a ranging accuracy greater than an accuracy threshold is available;
an indication for ranging range permission, indicating permission to perform ranging within a preset ranging range;
an indication for carrier frequency permission, indicating permission to use a preset carrier frequency for ranging;
an indication for ranging mode permission, indicating permission to use a unilateral ranging mode or a bilateral ranging mode for ranging; or,
an indication for wireless resource permission, indicating permission to use a preset wireless resource for ranging when there is no New Radio (NR) signal coverage.

2. The method of claim 1, wherein the ranging authorization policy comprises at least one of:
a business indication, indicating at least a ranging-related business; or, an indication for a first effective time, indicating an effective time of the ranging authorization policy.

3. The method of claim 1, wherein the permission indication further comprises an indication for angle measurement mode permission, and the indication for angle measurement mode permission indicates at least one of:
whether permission to perform angle measurement by measuring an Angle Of Arrival (AOA) is available, wherein the AOA is an angle between a signal receiving direction of a receiving antenna and a reference direction; or,
whether permission to perform angle measurement by measuring an Angel Of Departure (AOD) is available, wherein the AOD is an angle between a signal transmitting direction of a transmitting antenna and a reference direction.

4. The method of claim 1, wherein the ranging accuracy comprises at least one of:
an angle measurement accuracy; or,
a distance measurement accuracy.

5. The method of claim 1, wherein the permission indication further comprises at least one of:
an indication for accuracy level permission, indicating permission to perform ranging based on an angle measurement accuracy level; or,
an indication for accuracy range permission, indicating permission to perform ranging within an accuracy range.

6. The method of claim 2, wherein the business indication comprises at least one of:
an indication for a privacy protection business, indicating a business for which privacy protection is performed;
an indication for a second effective time, indicating a time to conduct privacy protection on the business for which privacy protection is performed;
an indication for a security protection business, indicating a business for which security protection is performed;

an indication for a third effective time, indicating a time to conduct security protection on the business for which security protection is performed;

an indication for a first mapping relation, indicating a mapping relation between business types and carrier frequencies used for ranging; or, an indication for a second mapping relation, indicating a mapping relation between business types and application layer IDs.

7. The method of claim 1, wherein reporting the ranging capability information indicating the ranging capability of the terminal comprises:

sending, by the terminal, a registration request message carrying the ranging capability information indicating the ranging capability of the terminal.

8. The method of claim 1, wherein the ranging capability information comprises at least one of:

a ranging accuracy related indication comprising at least one of:

an indication indicating that the terminal supports ranging with a ranging accuracy greater than an accuracy threshold; an indication indicating that the terminal does not support ranging with a ranging accuracy greater than an accuracy threshold; or, an indication indicating a ranging accuracy level supported by the terminal and an indication indicating a ranging accuracy range supported by the terminal; wherein the ranging accuracy comprises at least one of: an angle measurement accuracy or a distance measurement accuracy;

an indication indicating that the terminal supports angle measurement or an indication indicating that the terminal does not support angle measurement;

an indication indicating a carrier frequency supported by the terminal for ranging;

an indication indicating antenna information used by the terminal for ranging;

an indication indicating a ranging mode supported by the terminal, comprising at least one of: an indication indicating a unilateral ranging mode supported by the terminal or an indication indicating a bilateral ranging mode supported by the terminal, wherein the unilateral ranging mode is a mode of performing ranging based on a ranging signal sent by one of two terminals involved in the ranging, and the bilateral ranging mode is a mode of performing ranging based on ranging signals sent by both terminals involved in the ranging; or, an indication indicating an angle measurement mode supported by the terminal, comprising at least one of: an indication indicating that the terminal supports measurement of an AOA or an indication indicating that the terminal supports measurement of an AOD, wherein the AOA is an angle between a signal receiving direction of a receiving antenna and a reference direction, and the AOD is an angle between a signal transmitting direction of a transmitting antenna and the reference direction.

9. A communication method, comprising:

receiving, by a network side communication node, ranging capability information indicating a ranging capability of the terminal; wherein the ranging capability information comprises an indication indicating that the terminal supports ranging or an indication indicating that the terminal does not support ranging;

generating, by the network side communication node, the ranging authorization policy based on at least a part of the ranging capability information;

sending, by the network side communication node, a ranging authorization policy;

wherein the ranging authorization policy at least indicates whether a terminal has a ranging permission;

wherein the ranging authorization policy comprises a permission indication, indicating at least the ranging permission, and the permission indication comprises at least one of:

an indication for permission of initiating ranging, indicating whether permission to actively initiate ranging between terminals is available;

an indication for permission of monitoring ranging, indicating whether permission to monitor a ranging request sent by another terminal other than the terminal is available;

an indication for distance measurement permission, indicating whether permission to perform distance measurement is available;

an indication for angle measurement permission, indicating whether permission to perform angle measurement is available;

an indication for ranging accuracy permission, indicating whether permission to perform ranging with a ranging accuracy greater than an accuracy threshold is available;

an indication for ranging range permission, indicating permission to perform ranging within a preset ranging range;

an indication for carrier frequency permission, indicating permission to use a preset carrier frequency for ranging;

an indication for ranging mode permission, indicating permission to use a unilateral ranging mode or a bilateral ranging mode for ranging; or, an indication for wireless resource permission, indicating permission to use a preset wireless resource for ranging when there is no New Radio (NR) signal coverage.

10. The method of claim 9, wherein the ranging authorization policy comprises at least one of:

a business indication, indicating at least a ranging-related business; or an indication for a first effective time, indicating an effective time of the ranging authorization policy.

11. The method of claim 9, wherein the permission indication further comprises an indication for angle measurement mode permission, and the indication for angle measurement mode permission indicates at least one of:

whether permission to perform angle measurement by measuring an AOA is available, wherein the AOA is an angle between a signal receiving direction of a receiving antenna and a reference direction;

or, whether permission to perform angle measurement by measuring an AOD is available, wherein the AOD is an angle between a signal transmitting direction of a transmitting antenna and a reference direction.

12. The method of claim 9, wherein the ranging accuracy comprises at least one of:

an angle measurement accuracy; or a distance measurement accuracy.

13. The method of claim 9, wherein the permission indication further comprises at least one of:

an indication for accuracy level permission, indicating permission to perform ranging based on an angle measurement accuracy level; or an indication for accuracy range permission, indicating permission to perform ranging within an accuracy range.

14. The method of claim 10, wherein the business indication comprises at least one of:

an indication for a privacy protection business, indicating a business for which privacy protection is performed;

an indication for a second effective time, indicating a time to conduct privacy protection on the business for which privacy protection is performed;

an indication for a security protection business, indicating a business for which security protection is performed;

an indication for a third effective time, indicating a time to conduct security protection on the business for which security protection is performed;

an indication for a first mapping relation, indicating a mapping relation between business types and carrier frequencies used for ranging; or an indication for a second mapping relation, indicating a mapping relation between business types and application layer IDs.

15. The method of claim 9, wherein the ranging capability information comprises at least one of:

a ranging accuracy related indication comprising at least one of:: an indication indicating that the terminal supports ranging with a ranging accuracy greater than an accuracy threshold; an indication indicating that the terminal does not support ranging with a ranging accuracy greater than an accuracy threshold; an indication indicating a ranging accuracy level supported by the terminal or an indication indicating a ranging accuracy range supported by the terminal; wherein the ranging accuracy comprises at least one of:: an angle measurement accuracy or a distance measurement accuracy;

an indication indicating that the terminal supports angle measurement or an indication indicating that the terminal does not support angle measurement;

an indication indicating a carrier frequency supported by the terminal for ranging;

an indication indicating antenna information used by the terminal for ranging;

an indication indicating a ranging mode supported by the terminal, comprising at least one of:: an indication indicating a unilateral ranging mode supported by the terminal or an indication indicating a bilateral ranging mode supported by the terminal, wherein the unilateral ranging mode is a mode of performing ranging based on a ranging signal sent by one of two terminals involved in the ranging, and the bilateral ranging mode is a mode of performing ranging based on ranging signals sent by both terminals involved in the ranging; or an indication indicating an angle measurement mode supported by the terminal, comprising at least one of:: an indication indicating that the terminal supports measurement of an AOA or an indication indicating that the terminal supports measurement of an AOD, wherein the AOA is an angle between a signal receiving direction of a receiving antenna and a reference direction, and the AOD is an angle between a signal transmitting direction of a transmitting antenna and the reference direction.

16. A communication device, comprising:

an antenna;

a memory; and a processor connected to the antenna and the memory respectively, and configured to execute computer-executable instructions stored on the memory, control receiving and transmitting of the antenna, and to perform a method comprising:

reporting ranging capability information indicating a ranging capability of the terminal, wherein the ranging capability information comprises an indication indicating that the terminal supports ranging or an indication indicating that the terminal does not support ranging;

receiving a ranging authorization policy;

wherein the ranging authorization policy is generated by the network side communication node based on at least a part of the ranging capability information; the ranging authorization policy at least indicates whether a terminal has a ranging permission;

wherein the ranging authorization policy comprises a permission indication, indicating at least the ranging permission, and the permission indication comprises at least one of:

an indication for permission of initiating ranging, indicating whether permission to actively initiate ranging between terminals is available;

an indication for permission of monitoring ranging, indicating whether permission to monitor a ranging request sent by another terminal other than the terminal is available;

an indication for distance measurement permission, indicating whether permission to perform distance measurement is available;

an indication for angle measurement permission, indicating whether permission to perform angle measurement is available;

an indication for ranging accuracy permission, indicating whether permission to perform ranging with a ranging accuracy greater than an accuracy threshold is available;

an indication for ranging range permission, indicating permission to perform ranging within a preset ranging range;

an indication for carrier frequency permission, indicating permission to use a preset carrier frequency for ranging;

an indication for ranging mode permission, indicating permission to use a unilateral ranging mode or a bilateral ranging mode for ranging; or, an indication for wireless resource permission, indicating permission to use a preset wireless resource for ranging when there is no New Radio (NR) signal coverage.

* * * * *